Dec. 27, 1966 KEIICHI HITOMI ETAL 3,293,719
APPARATUS FOR PRODUCING HIGH BULK FIBROUS MATERIAL
Original Filed Oct. 3, 1961   12 Sheets-Sheet 10

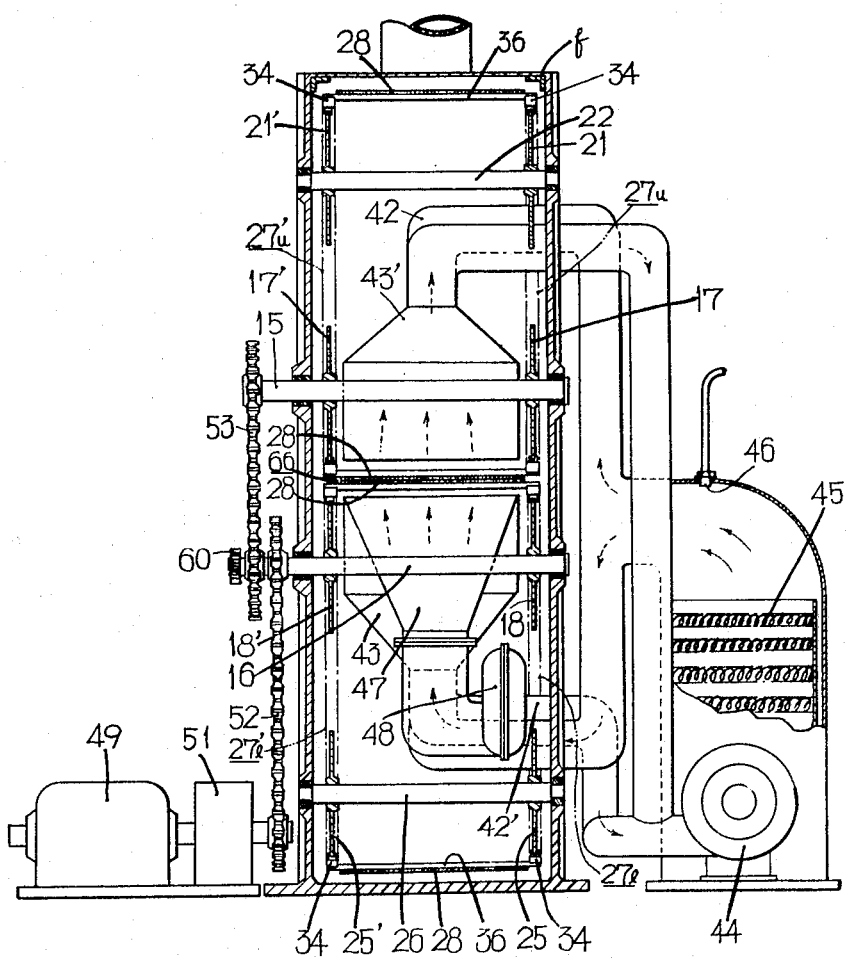

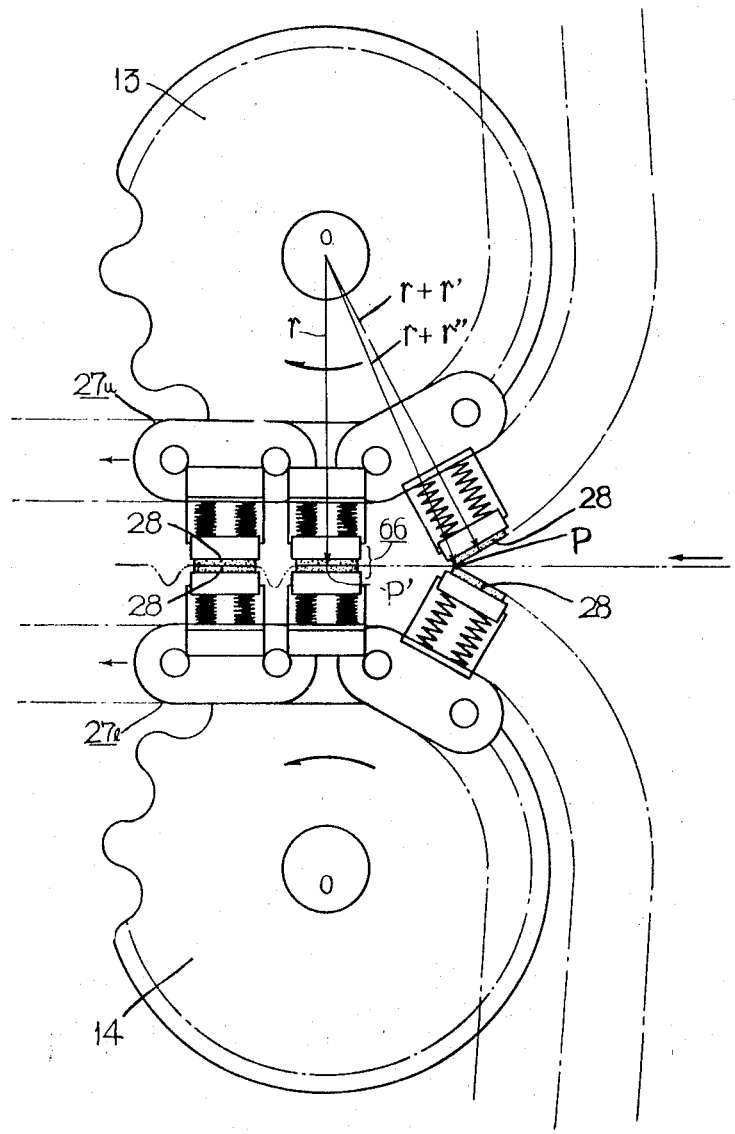

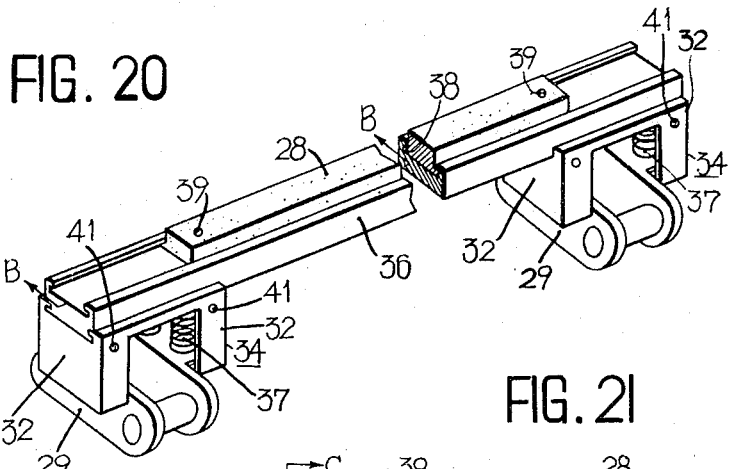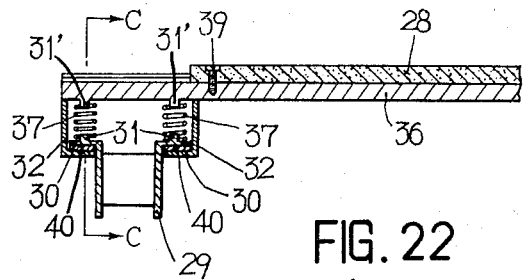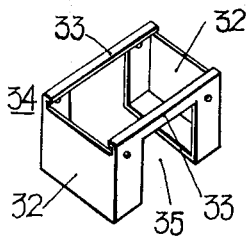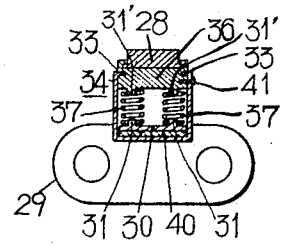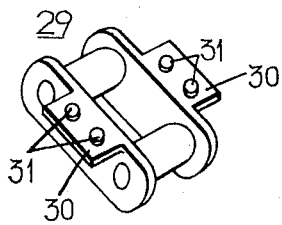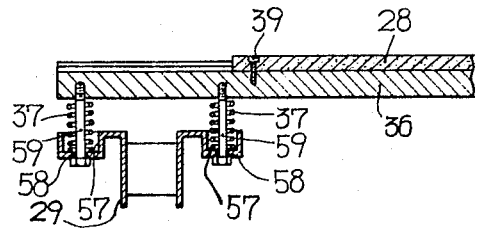

Dec. 27, 1966  KEIICHI HITOMI ETAL  3,293,719
APPARATUS FOR PRODUCING HIGH BULK FIBROUS MATERIAL
Original Filed Oct. 3, 1961  12 Sheets-Sheet 12
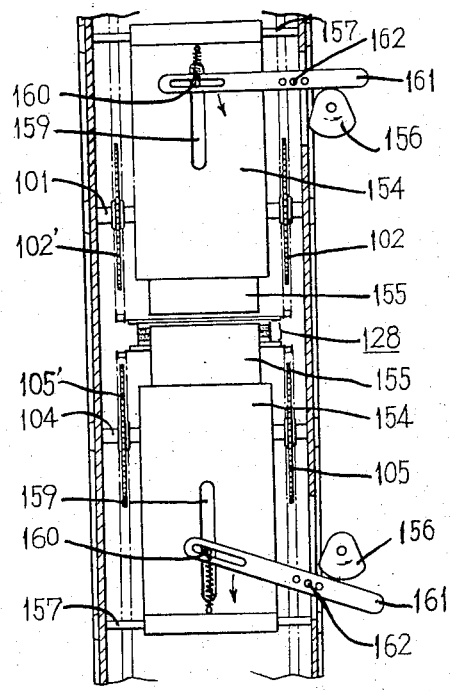
FIG. 32
FIG. 33
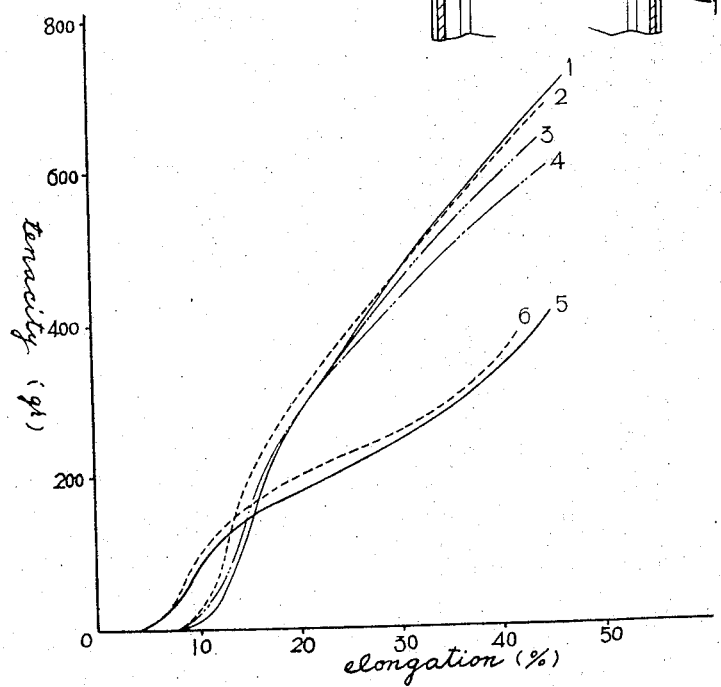

{ # United States Patent Office

3,293,719
Patented Dec. 27, 1966

3,293,719
APPARATUS FOR PRODUCING HIGH BULK FIBROUS MATERIAL
Keiichi Hitomi, Kachio Takagi, and Seinosuke Nomura, Tokyo, and Sadayuki Okada, Odawara-shi, Japan, assignors to Mitsubishi Reiyon Kabushiki Kaisha and Daido Keori Kabushiki Kaisha, both of Tokyo, Japan
Original application Oct. 3, 1961, Ser. No. 142,546, now Patent No. 3,248,771, dated May 3, 1966. Divided and this application Oct. 22, 1965, Ser. No. 500,600
8 Claims. (Cl. 28—1)

This is a division of application Serial No. 142,546, filed October 3, 1961, now U.S. Patent No. 3,248,771, granted May 3, 1966.

The present invention relates to new and improved machines for producing high bulk and potentially high bulk fibrous materials, and more particularly to improvements in producing high bulk and potentially high bulk synthetic fibrous materials, especially textile products.

Bulky textile fibers are known. These fibers are frequently prepared by applying processings such as heat treatment, twisting and untwisting or like treatments to fibers in the form of yarns. Fibers for use in high bulk textile products are also frequently prepared by means of mechanical crimping. Also, fibers for use in high bulk textile products are found in the form of fibers looped in a random manner by applying jets of compressed air thereupon. Fibers for use in high bulk textile products are prepared and made generally available by many other means.

The high bulk textile products which are known and serve to clarify the principles of the present invention are known as high bulk yarns obtained by applying heat treatment to the spinning material which consists of mixtures of shrinkage and non-shrinkage fibers after said material has been spun, whereby the shrinkage fibers are shrunk and thus the non-shrinkage fibers project out.

An object of the invention is to provide novel and improved fibrous material having superior properties to give high bulk textile products which are novel and improved in high bulkiness and mechanical properties.

Another object of this invention is to provide fibrous materials which are characterized in the sense of being usable for high bulk textile products having well-balanced properties, and excellent appearance and feel to the touch and the like.

Still another object of the invention is to provide fibrous material for use in high bulk textile products. The fibrous material is not limited in kind and type and is able to be given sufficient bulkiness in any condition and at any stage of processing, for instance, prior to and following the yarn spinning process and in the form of knitted, woven and non-woven fabrics.

In order to fulfill the above-mentioned objects, fibrous material according to the invention consists of single filaments, each having in the direction of the fiber axis alternately a high shrinkage portion which shrinks to a greater extent upon being subjected to subsequent treatments such as by heating, and a low shrinkage portion which shrinks to a lesser extent under the same conditions.

A further object of this invention is to provide a novel process which is characterized by the fact that in the process each of the single filaments of the above-mentioned fibrous material can have in the axial direction alternately a high shrinkage portion which shrinks to a greater extent upon being subjected to subsequent treatments such as by heating and a low shrinkage portion which shrinks to a lesser extent upon being subjected to the subsequent treatments.

In order to obtain the above-described novel fibrous material for use in high bulk textile products, it is the primary object of the invention to provide a novel apparatus for the production of fibrous material. The apparatus comprises, in combination; an apparatus for feeding fiber bundles while the fiber bundles are fed and an apparatus for applying preliminary treatments such as heat treatment or chemical treatment to said gripped fiber bundles. The meaning of "preliminary treatments" will be defined hereinbelow.

Further, according to the invention, high bulk textile products such as novel and improved threads, knitted, woven or non-woven fabrics, industrial use textile products and the like are produced from the fibrous material obtained in the above-described method.

Underwear, outerwear, fancy works, ornamental goods, carpets and other finished textile products having the bulkiness can be produced from the above-mentioned textile products.

Other objects, principles, further particularities, characteristics, functions, effects and merits of this invention as well as those of the process and equipment according to the invention will be apparent from the following detailed description taken in connection with the accompanying drawings in which:

FIGURE 1 is a diagrammatic representation of a general example of the fibrous material for use in high bulk textile products (which may be very often referred to only as "the fibrous material" hereinafter).

FIGURES 2a and 2b are diagrams to represent a basic property of the fibrous material according to the invention, in which FIGURE 2a shows many of the fibers arranged in parallel and given preliminary treatments and single filaments of the fibrous material the same as are shown in FIGURE 1, while FIGURE 2b illustrates the fibrous material shown in FIGURE 2a being given secondary treatments by heating.

FIGURE 4a shows a parallel arrangement of high shrinkage fibers and non-shrinkage fibers mixed, while FIGURE 4b represents the fibers of FIGURE 4a after being given a heat-treatment.

FIGURE 8a represents a condition prior to the preliminary treatments, and FIGURE 8b, a condition after the said treatments.

FIGURE 18 is a section along the A—A line of FIGURE 17.

FIGURE 19 is a diagrammatic enlarged partial side view to represent the overfeeding mechanism and its principles.

FIGURE 20 is an enlarged perspective view, partly broken away, to represent a gripping piece fixed on a chain link.

FIGURE 21 is an enlarged section along the B—B line of FIGURE 20.

FIGURE 22 is an enlarged section along the C—C line of FIGURE 21.

FIGURE 23 is an enlarged perspective view of a spring case.

FIGURE 24 is an enlarged perspective view of a chain link.

FIGURE 25 is an enlarged perspective view representing another example of a gripping piece fixed on a chain link.

Figure 26:
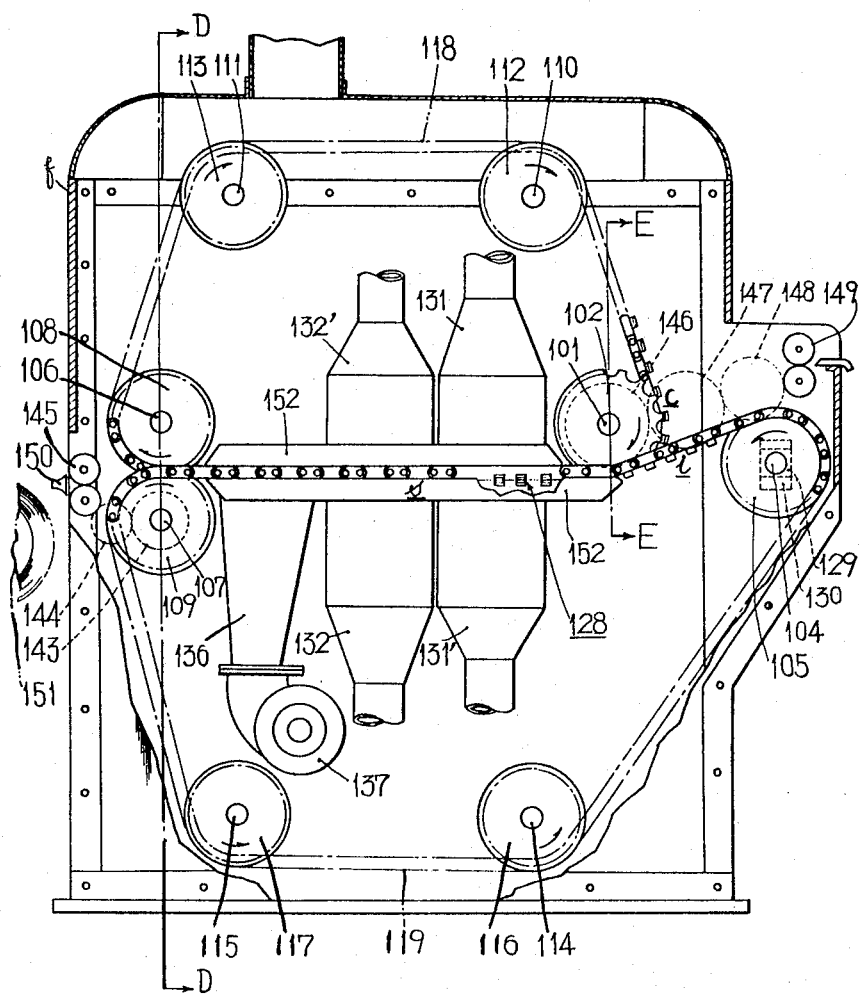
Figure 27:
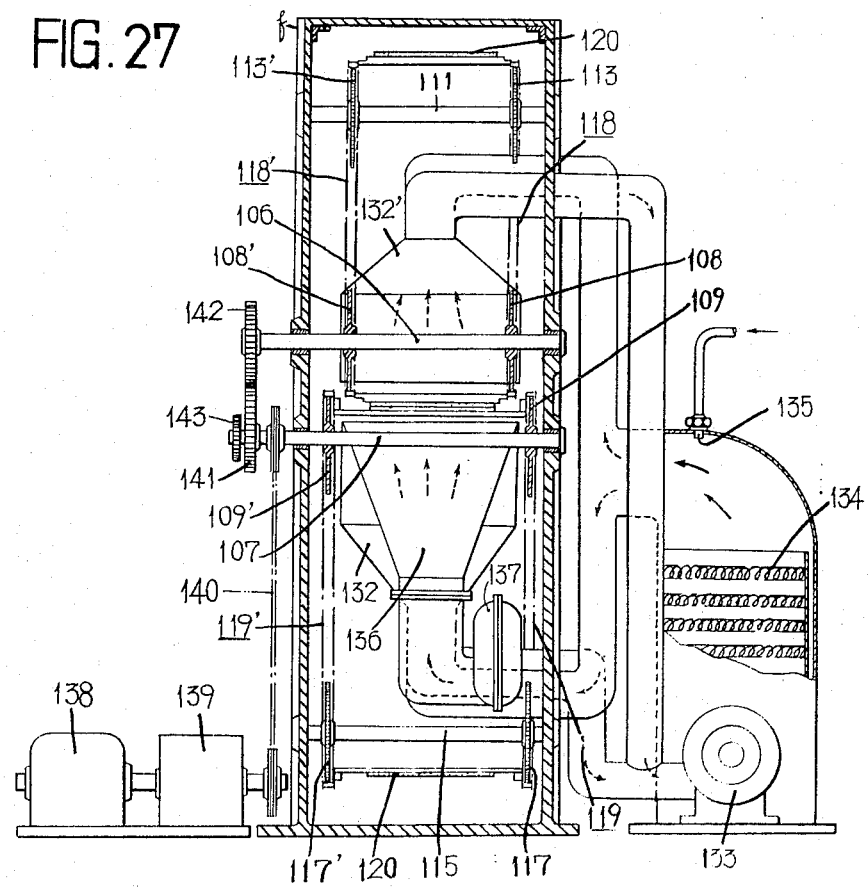
Figure 28:
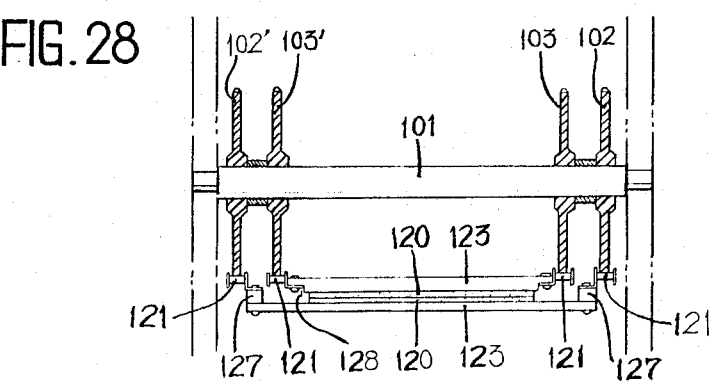
Figure 29:
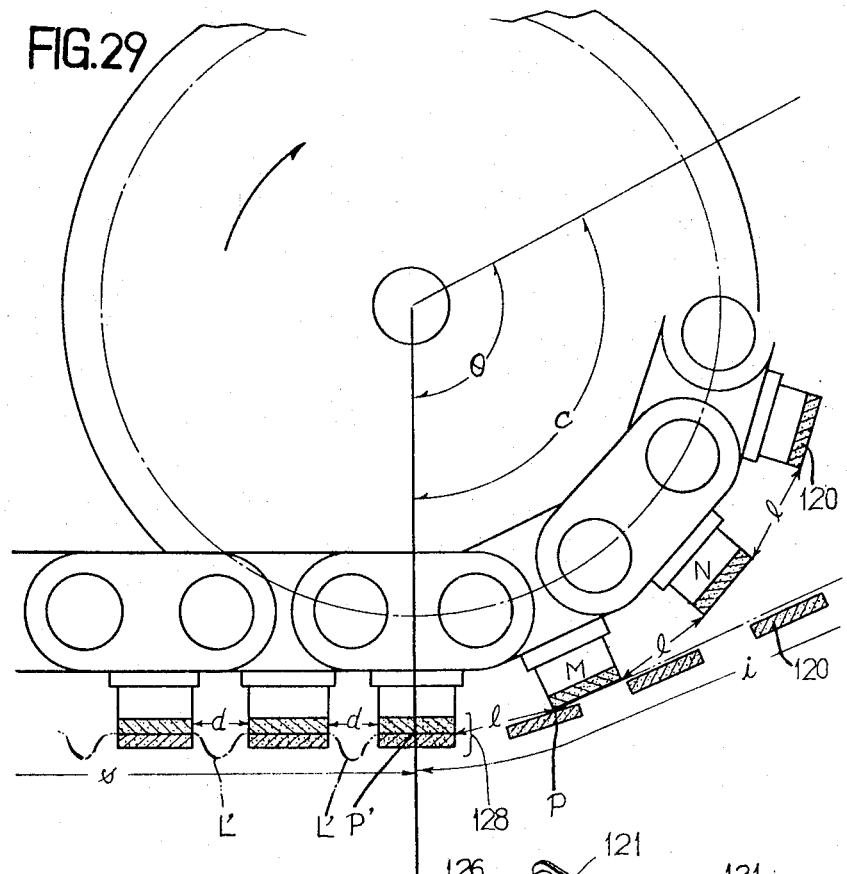

FIGURES 26–29 represent another useful continuous production apparatus according to the invention; FIGURE 26 is a side view of said apparatus, partly broken away; FIGURE 27 is a section view along the D—D line of FIGURE 26; FIGURE 28 is an enlarged section along the E—E line of FIGURE 26; FIGURE 29 is an enlarged partial side view representing diagrammatically the overfeeding mechanism.

Figure 30:
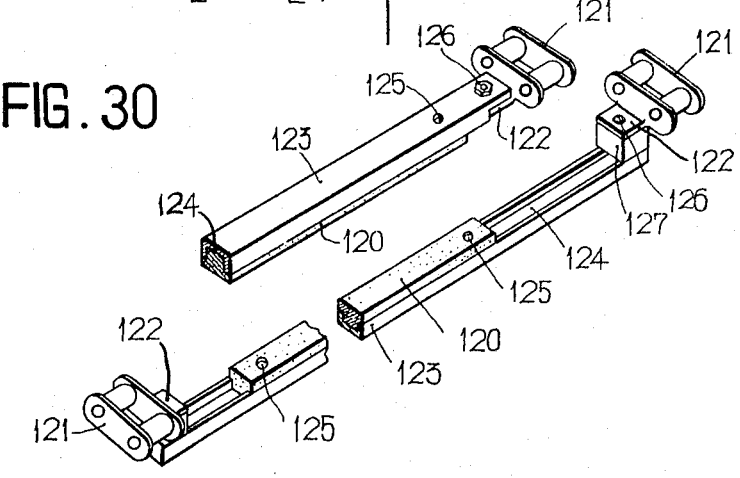

FIGURE 30 is an enlarged perspective view, partly broken away, representing a gripping piece on a chain link.

Figure 31:
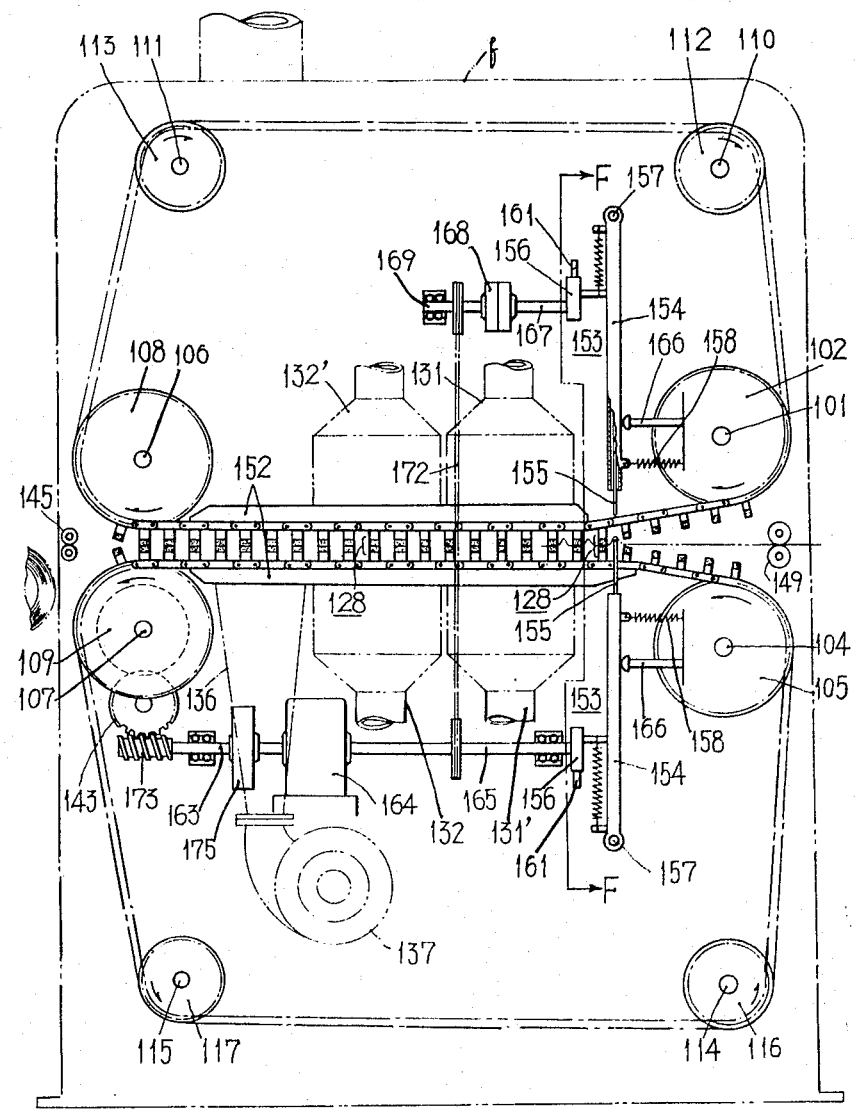

FIGURE 31 is an enlarged side view, partly broken away, of further useful continuous production apparatus.

FIGURE 32 is a section along the F—F line of FIGURE 31, and,

FIGURE 33 is a plot of tenacity and elongation curves.

The meaning of terminology as used through the present specification and appended claims is given below:

The term "single filament" or "elongated fibrous unit" is used to represent one of the minimum units of a fiber. No matter what designation may be used, "single filament" or "elongated fibrous unit" has substantially the above meaning. Sliver, top, tow, filament or the like is used throughout this description to mean a common thing, regardless of the condition, shape or properties of any given fiber.

H and L are relative to each other; by the letter "H" is meant the nature and portion of high shrinkage due to treatments such as heating or the like; by the letter "L" is meant the nature and portion showing none or little shrinkage due to treatments such as heating or the like. A nature showing more than approximately 5% difference in shrinkage against H is included in L.

By the letter L' is meant the portion which should subsequently be designated as L.

By "preliminary treatments" is meant an operation to provide fibers which in the direction of its axis have alternate H and L portions of the prescribed length by completing partial relaxation (under tension or non-tension) or stretching of the said fibers by means of treatments such as heating, and by "secondary treatments" is meant an operation whereby after the fibers having alternate H and L portions are spun into yarns, or then woven or knitted or made into non-woven fabrics, and the L-portion is projected out in relation to the shrinkage of H-portion due to treatments such as heating.

As heating medium for the said fibers, either a dry heat or a wet heat can be used. Heat treatment can be replaced by solvent treatment either in the gas phase or the liquid phase, dielectric heating or a radiation treatment.

The invention is applicable to any man-made and natural fibers. Particularly preferable fibers in this respect are those which possess a nature that such strain imparted by stretching is fixed under normal conditions. The strain due to stretching is relaxable with accompaniment of shrinkage, upon subsequently being treated such as by heating or the like.

For this purpose, polyacrylic fibers are highly recommended. Similarly, polyvinyl alcohol-, polyester-, polyolefin-, diacetate-cellulose-, and triacetate cellulose fibers are preferable.

The special features of the novel fibrous material according to the invention will be apparent in comparison with known bulky yarns from the following description taken in connection with the accompanying drawings. In the following description, the fibrous materials according to the invention are those treated by heating.

Figure 1:
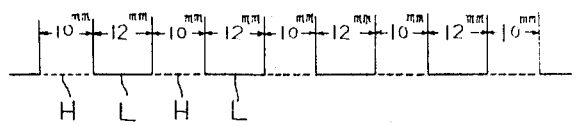

The fibrous material according to the invention is shown in FIGURE 1.

For a better understanding, conventional bulky yarns are described first.

CONVENTIONAL BULKY YARNS

Figure 4A:
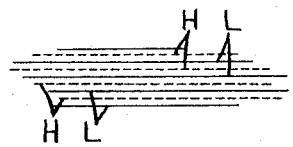
FIGURES 4a and 4b represent diagrams to describe the processing theory for conventional fibers.
Figure 5A:
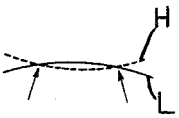
FIGURES 5a and 5b are enlargements of a pair of the strands shown in FIGURES 4a and 4b, respectively.
Figure 7:
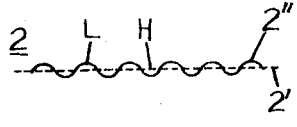
FIGURE 7 is a diagrammatic view of conventional bulky yarns.

First, reference is made to FIGURES 4a, 5a and 7 of the accompanying drawings. High shrinkage fibers are denoted H which shrink by heating at temperatures higher than 50–60° C. and low shrinkage fibers denoted L are employed as materials, which are mixed normally, for instance, at a ratio of 40:60. The mixture is called "conventional fibrous material," as against the fibrous material according to the invention.

Figure 5B:
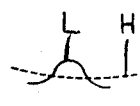

When the known fibrous materials are spun into yarns and subsequently heated, the yarns become high bulk yarns as shown diagrammatically in FIGURE 7 due to the L fibers bulking out because of the shrinkage of H fibers subjected to the resistance of fiber bundles or due to twisting as shown in FIGURES 4a and 5b. In this case, the parts as denoted by arrows in FIGURE 5a seem to remain substantially unshifted under the resistance caused by twisting and the like.

HIGH BULK YARNS USING THE FIBROUS MATERIAL ACCORDING TO THE INVENTION

Reference is made to FIGURES 1, 2a, 3a and 6. The fibrous material according to the invention comprises a plurality of single filaments. Each of the single filaments has, in the direction of the fiber axis, alternately a high shrinkage portion H, which shrinks to the greater extent by heat treatment at temperatures higher than 50–60° C. and a low shrinkage portion L.

The length of the portion H may be selected at will, while that of the portion L can be determined by predetermining the ratio L/H at a proper value.

The process for producing the above-mentioned fibrous material will be fully described. Now, the starting material comprises only such fibers which may shrink mainly by heating. This material or fibers is gripped by suitable mechanical means at a number of axially spaced portions therealong, and subjected to heat treatment before spinning with said gripped portions being thus isolated from the influence of the heating medium. The exposed, axially spaced portions L of the fibers are subjected thereby to the heat treatment, while on the contrary, the gripped portions H are effectively insulated from heating. In practice, the length H and the ratio H:L can be selected at will. In the example, shown in FIGURE 3a, the relation H:L is selected to be 10:12 mm. FIGURE 1 has been also plotted under these numerical assumptions.

Figure 2A:
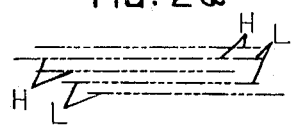
Figure 2B:
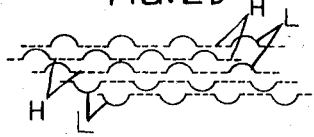
Figure 3A:
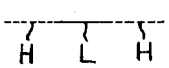
FIGURES 3a and 3b represent a single filament of the fibrous material of FIGURES 2a and 2b on an enlarged scale.
Figure 3B:
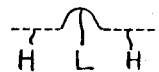

When the fibrous material has been spun into yarns and then subjected to a second heat treatment, the L portions accompanied by the shrinkage of the H portions are bulked as shown diagrammatically in FIGURES 2b and 3b, and consequently, high bulk yarn is produced.

Figure 6:
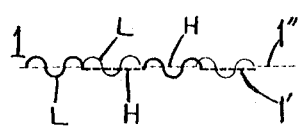
FIGURE 6 is a diagrammatic view of yarns prepared by using the fibrous material according to the invention.

Those skilled in the art understand that in a spun yarn the threads or filaments are restricted longitudinally at axially spaced points of the yarn and not as shown diagrammatically in FIGURE 2b. In FIGURE 6, yarn made of fibrous material according to the invention is generally designated 1. In FIG. 7, conventional bulky yarn is generally designated 2. In these figures, single filaments are denoted by 1', 1" and 2', 2", respectively. The novel yarn 1 comprises two single filaments, each comprising a number of alternately arranged portions H and L. For clarity, portions H are illustrated in chain lines, while portions L are shown in full lines. In addition, one filament 1' is shown with a thick line and the other filament 1" is illustrated with a thin line.

It will be noted from FIGURE 7, one filament 2' of the conventional bulky yarn 2 consists wholly of the H type fiber and the other filament 2" comprises an L type fiber. More specifically, the conventional bulky yarn comprises two types of completely different fibers H and L, while the novel fibrous material of the invention comprises a plurality of filaments, each of which comprises an alternate arrangement of different portions H and L, extending in the axial direction of the fiber, thus providing a substantial difference between the two and thereby giving possibilities of producing remarkable differences in the nature and quality of the final products prepared therefrom. The realizable difference in appearance, tenacity and elongation, elastic recovery, uniformity in bulkiness and other physical properties of the final products, such as threads produced from the novel and the conventional fibrous material are as follows:

(I) *Tenacity and elongation*

Figure 4B:
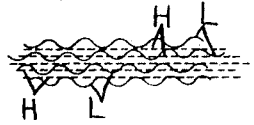

In connection with the tenacity, which will be easily recognized from the uniformity in bulkiness, the novel filaments 1 have greater tenacity and less bulked-out projections as produced after bulking treatment than in the case of the conventional filaments 2, as illustrated in FIGURE 4b. Thus, with the novel filaments, almost all of the constituent fibers take part in providing the tenacity of the produced bulky yarn, so that the strength thereof may be amazingly increased.

The following table, which shows relative experiments on knitting yarns as produced both in the novel and conventional ways and demonstrates the degree of tenacity decrease as produced in the bulk-treated yarns in comparison with those before such treatment.

(II) *Degree of elastic recovery*

From reasons as was set forth in item I, the conventional filaments 2 provide their elastic recovery solely relying upon the H-fiber components, preferably premixed about 40% of the total, while the L-components are floating during the initial loading conditions of the yarn. On the contrary, with the novel filaments 1, elastic recovery is provided by the action of all the contained fibers, even when initially loaded. Thus, the recovery will be amazingly improved after loading and without any substantial influence upon the Young's modulus of the yarn produced therefrom.

The above-mentioned tenacity-elongation curves are shown in FIGURE 33. Under initial loading only, H-components fibers preliminarily mixed therein take charge of resisting the load, while L-components become floating during the same period. The aforementioned tendency of the conventional filaments 2, may be clearly acknowledged by the substantial displacement of yield point of the conventional yarn.

Further, under higher loaded conditions, the conventional filaments 2 are liable to be subject to a remarkable relative shift or slippage of H-fibers, or even breakage thereof, and then to deformation in the fibers in the sheath part, thus showing practically a permanent deformation of the yarn. On the contrary, with the novel filaments 1, a satisfactory elastic recovery may be provided after higher loaded conditions.

(III) *Uniformity in bulkiness*

As is commonly known, the degree of uniformity in bulkiness of yarn not only has a large influence upon the appearance, touch and the like esthetic performances, but also has an intimate relationship with the mechanical properties of the final products produced from the yarns. This factor plays a great role in the finishing procedure of knitted, woven fabrics and threads or the like made from the yarns.

More specifically, the conventional bulky yarns as denoted by (2) have a deficiency in that they are flattened, in case they are dyed as yarn under heat and tension. This drawback is attributable mostly to the change in state of the aforementioned floating fibers. Effective remedies for solving this drawback have not yet been found and the problem is now getting serious in various

TABLE

| Test No. | Kind of Yarn | Yarn Count Before Bulking | Degree of Contraction of Yarn, percent | Tenacity, grs. | | | Elongation, percent | |
|---|---|---|---|---|---|---|---|---|
| | | | | Before Bulking | After Bulking | Reduction, percent | Before Bulking | After Bulking |
| 1 | Novel yarn [1] | 2/33 | 26 | 765 | 719 | 6 | 12 | 47 |
| 2 | ___do___ | 2/36 | 26 | 691 | 675 | 2 | 11 | 44 |
| 3 | ___do___ | 2/38 | 25 | 631 | 620 | 2 | 11 | 43 |
| 4 | ___do [1]___ | 2/36 | 26 | 627 | 604 | 4 | 11 | 44 |
| 5 | Comparable conventional yarn.[2] | 2/36 | 28 | 647 | 412 | 36 | 12 | 45 |
| 6 | ___do [3]___ | 2/36 | 27 | 635 | 386 | 39 | 12 | 4 |

[1] Yarn count is same as in case 2, but the preliminary twist has been selected to be 10% less than in the latter case.
[2] H:L=40:60; turbo top was used.
[3] H:L=40:60; cut fiber top was used.

The same considerations may be applied to the case of elongation. With the conventional filaments 2, the core fibers comprising mostly H fibers are in a state of substantially straight arrangement, while with the novel filaments the above-mentioned straight arrangement of core fibers does not exist in any way and generally forms a spiral shape, thereby elongation in the initial elongating stage becomes considerably large, as will be illustrated in detail in connection with tenacity curves plotted against elongation.

fields of textile manufacturing. These difficulties can be solved by the invention by the novel fibrous material having a proper length of H, a suitable ratio of H:L and a favorable shrinkage of each single filament or fiber are employed. Consequently, efficient uniformity in the bulkiness and a substantially equal appearance to that of knitting yarn by 100% wool products can be obtained.

Fibrous material which were properly chosen as was seen above does not show any flattening tendency when the abovementioned finishing procedure is carried out.

(IV)

As to the conventional bulky yarns, it has been reported many times from the view point that the ratio $H:L$ should be employed in consideration of the expected properties of the yarn, the shrinkage caused by uneven mixture, the uniformity of bulkiness, the degradation of yarn tenacity, the bulkiness and the like. Every report recommends a mixing ratio of ca. 40:60 to be most efficient, and has tendency to deny to change this ratio greatly. However, according to the invention, the problem involved in the above view point is being solved. Namely, the above solution is brought by changing in the shrinkage degree of H-fibers, the length of H, the ratio of $H:L$, as well as a combination of these factors. With respect to the novel fibrous material as obtained by the invention, satisfactory products can be obtained from being affected greatly upon properties, appearance, and touch by H-fibers' properties and separation between higher shrinkage portion H and lower shrinkage portion L.

Thus, according to the invention, there are the shrinkage ratio of fiber itself described in IV, and the combination of the length of H and the ratio of $H:L$. Furthermore, there are various kinds of combinations based on the invention. These combinations may be applied to various cases which will be described in the next paragraph, in order to obtain particular characteristics and merits.

(V)

Figure 11:
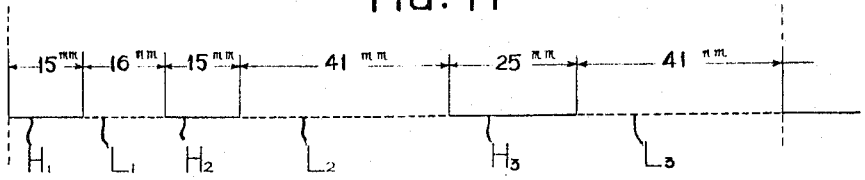
FIGURE 11 shows diagrammatically the structure of one type of fibrous material according to the invention.

Another type of novel fibers shall be illustrated with reference to the several accompanying drawings:

In FIGURE 11, the fibrous material representing various ratios of $H:L$ is schematically shown. In the figure, $H_1$ shows a high shrinkage portion having a length of 15 mm. $L_1$ represents a low or non-shrinkage portion, 16 mm. in length. In the similar way, high shrinkage portions $H_2$ and $H_3$ extend 15 and 25 mm., respectively. Low shrinkage portions $L_2$ and $L_3$ are 41 mm. in length, respectively, as is shown. The single filament comprises a number of units, each having the above mentioned six elements $H_1$, $L_1$, $H_2$, $L_2$, $H_3$ and $L_3$.

Now, considering in this case, between two of the fibrous materials having the relation $H:L$ of 10:15 (mm.) and 10:25 (mm.), respectively, the apparent bulkiness of the latter will be larger than that of the former, when such kind fibrous material are shaped into yarns, fabrics and the like.

As a further example, two fibrous materials having the relation $H:L$ of 10:15 (mm.) and 20:30 (mm.) are considered. In this case, the latter will represent a lower Young's modulus than in the case of the former so that it may become more soft when such kind fibrous material are shaped into yarns, fabrics and the like.

Thus, various properties may be possessed by the final products, depending upon the length H, as well as upon the ratio of $H:L$. It will thus be clear that the relation of lengths H and L should be selected depending upon the desired final use of the novel fibers.

As an aspect of the invention, therefore, the single filament comprises cyclically arranged units, each of which includes two or more different lengths of H and ratios of $H:L$. By this means, yarns knitted or woven products produced from these novel single filaments may represent highly complicated compositions.

In connection with the fibrous material having compositions as set forth in the above, hand effects similar to those obtainable by the conventional mix-spinning of variable denier fibers or variable length fibers which is commonly employed in the conventional spinning process are recognized, thereby providing highly complicated mixing and configurating effects. Moreover, according to the invention, the conventional mix-spinning stage can be omitted and the mixing effects which assures the uniformity of the final products can be remarkably improved.

(VI)

Figure 12:
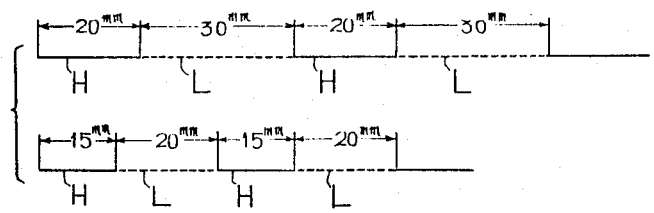
FIGURE 12 is a similar view of another embodiment of the fibrous material of the invention.

In FIGURE 12, two kinds of a single filament mixed are schematically shown, which have different lengths of H and different ratios of $H:L$ to each other. It is also possible to mix three or more such different filaments together.

By the above-mentioned measures, not only variations in length H and ratios $H:L$, but also other factors such as variable denier, variable fiber length and the like may be further incorporated in the bulky yarn products. For example, the deniers of the filaments are 3 and 5, respectively. The relation of $H:L$ are 20:30 (mm.) and 15:20 (mm.), respectively. In addition to such modified filaments, when the fibrous material of different H and L described in V having complicated and mixed effects are used, high bulk textile products with more peculiar hand and other properties may be provided.

(VII)

Figure 13:
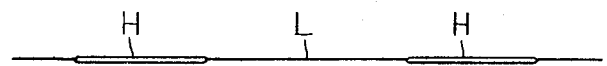
FIGURE 13 is a similar view of a further embodiment of the fibrous material of the invention.

In FIGURE 13, fibrous material having variable denier portions is schematically illustrated. It is noted that the portion H is relatively thick, while the portion L is thin.

These thick and thin portions having variable deniers do not show the shape of fibrous material after preliminary treatment, but show that after spinning into yarn and giving secondary treatment to them.

The high bulk textile products produced from above fibrous material are having peculiar hand and other properties being different from said described products.

(VIII)

Figure 14:
FIGURE 14 is a similar view of yet a further embodiment of the fibrous material of the invention.
}

In FIGURE 14 are shown the fibrous material that only H-portion are situated in the extreme ends of a single filament.

When this type of filaments are employed, spun and subjected to the secondary treatment, these provide the yarn which is less fuzzy by drawing the extreme ends of filaments in the yarn.

(IX)

Figure 15:
FIGURE 15 is a similar view of a still further embodiment of the material of the invention.

A single filament illustrated schematically in FIGURE 15 has L-portions at its extreme ends. When this type of filaments are spun and subjected to the secondary treatment, these provide the yarn which is more fuzzy.

The above described feature that the opposite ends of a novel filament are shaped solely in the form of H- or L-portion, is preferably combined with any of the novel features as set forth hereinbefore in its V–VII. As a result, the fibrous material with deformed shape and characteristics are obtained.

It will be clear that all the special features as already mentioned above can be combined efficiently with any one of those which will be explained hereafter. As a result, this gives various possibilities to provide still improved properties and hands to the bulk textile products prepared from the novel fibrous material according to the invention.

(X) *Filaments*

According to conventional techniques there are various ways in obtaining textured yarns from filaments, of which two general classes are known, namely, high expansibility and shrinkage, and high bulkiness. As regards the latter process, there are loop formation of fibers by means of compressed air streams as is seen in Taslan's case and mixed twisting between high and low shrinkage yarns.

Next, the application to filaments of the invention shall be described in detail with reference to FIGURE 16 hereinunder:

As is shown in the figure, the filaments are temporarily untwisted and arranged preferably in parallel or unchanged state. Under these conditions, they are subjected to the primary treatment to represent H-portions and L-portions alternately in the oblique direction and then subjected to the secondary treatment for obtaining high bulkiness. In the above processing, secondary treatment after two or more fibers are plied together, is more effective. Instead of forming each kind of portion in a laterally oblique direction, it may be made a right angle with the fiber direction, if desired.

After the above primary treatment, the filaments may be treated by means of compressed air jet streams to subject the fibers to random looping thereof, as well as to shifting and random arrangement of neighboring similar portion, i.e. random arrangement of H and L portions. Then, the filaments are subjected to the secondary treatment for the purpose of bulking after one plied yarn or more are manufactured. As a result, various outstanding features may be added compared with bulkiness by the ordinary loop formation.

(XI)

Still another type of fibrous material according to the invention may consist of blend with shrinkage and nonshrinkage natural and artificial fibers, when a single fibrous material is blended.

If high and low shrinkage fibers are blended with wool according to the conventional bulky yarn preparing process, the low shrinkage fibers L are normally positioned within the sheath portion, the wool fibers within the intermediate portion and the high shrinkage fibers H within the core.

With use of the aforementioned novel fibrous material, however, the similar processing will normally result in that the wool fibers occupy the relatively outer layers, so that the desirous and advantageous quality of material having an excellent "feel" when touched may be highly improved, for instance, in the case of mixed fiber spinning with wool fibers.

(XII) *Knitted and woven fabrics*

According to the invention using the above-mentioned fibrous material, high bulk knitted and woven fabrics may be provided in addition to the yarns as mentioned above. These final products represent high tenacity, high initial elongation value, low plastic deformation, high elasticity and successful spongy characteristics favorable to hand touching thereof. The constituent fibrous materials are less fuzzy, so that the surface of the fabrics produced therefrom is smooth and clear, thereby possessing especially high resistance to raising and pilling. These products represent not only least unevenness in the bulkiness, but also substantially no change in their color shade before and after bulking in the case of yarn dyed fabrics.

For carrying the invention into effect, there are generally two ways of processing. In the first place, the novel fibrous material is prepared by subjecting it to the primary treatment under consideration of the desired nature and characteristics to be possessed by the intended final products, such as design fabrics, heavier or lighter fabrics, and the like which are spun into yarns or threads and then worked into knitted or woven products, which are then subjected to the secondary treatment. In the second place, the fibrous material after being treated primarily, is successively subjected to the secondary treatment in the form of yarn, and then worked into knitted or woven products. The thus produced final products through either processing may successfully provide the aforementioned additional characteristics to those obtainable by the conventional bulky yarn preparing process. More specially, the latter process is especially characterized by the higher tenacity, least fuzzing tendency and the like of the yarn, which mean high superiority and large convenience in the knitting or weaving process.

(XIII) *Non-woven fabrics*

According to the invention, non-woven bulky fabrics can also be produced. All of the aforementioned novel fibrous material may be advantageously employed for production of non-woven fabrics.

Non-woven bulky fabrics prepared from the novel material are characterized by their uniformity, since the webs may be successfully mixed together even by a single process, which uniformity is especially shown by the thickness and mechanical strength of the thus produced non-woven fabrics. The above mentioned advantage obtained by the invention, that is, the dispensability of the mixing stage will contribute to a substantial reduction of the production costs.

To accomplish various purposes as have been described above, apparatuses by the invention are schematically shown in the several figures of the accompanying drawings.

The term "Example" as set forth hereinafter will be directed substantially to the process and the stages thereof.

EXAMPLE 1

This example shall be explained in connection with the production of novel filaments, H-portion and L-portion of which extend 10 mm. and 12 mm. long, respectively.

FIGURES 8a and 8b, 9–10 illustrate schematically a high simplified device for producing above mentioned type of fibrous material according to the invention.

Figure 9:
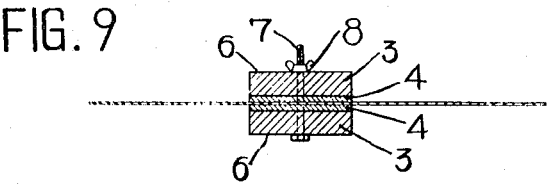
FIGURE 9 represents a vertical sectional view of a sectional zone of the said apparatus.
Figure 10:
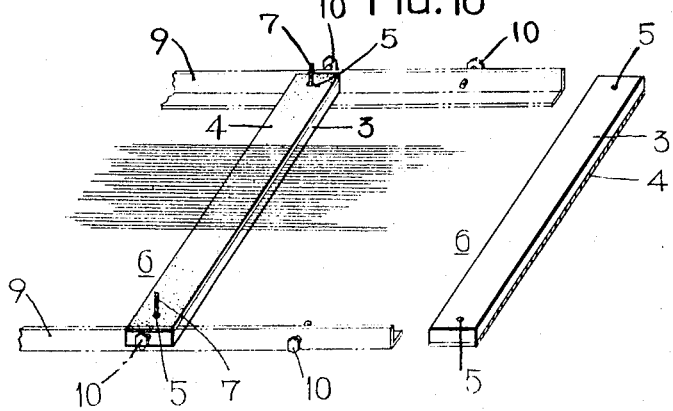
FIGURE 10 represents a perspective view of the gripping unit, viewed separately.

The device comprises a number of grippers, each consisting of a couple of cooperating gripper pieces 6. Each gripper piece 6 is made preferably of iron 3 and has an elongated form, the width of which is selected to be 10 mm., that is, equal to the length of each portion H. Each piece 6 is lined on its inside surface with an elastic strip 4, preferably made of rubber, plastics or the like. Each set of piece 6 is detachably united together by means of set bolts 7, passing through clearance holes 5, which have been drilled through the piece and liners, with the latter abutting against each other as shown in FIGURE 9. The gripper is tightened on bolts 7 by nuts 8.

Figure 8A:
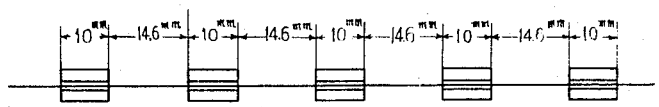
FIGURES 8a and 8b represent diagrammatically the simplest apparatus for the production of the fibrous material according to the invention as well as an example of the invention wherein said apparatus is used.
Figure 8B:
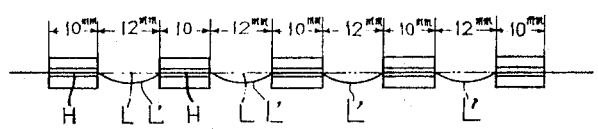

As the starting material to be processed, top turbo stapler of acrilonitrile fibers are employed. The above fibers have been heat stretched at a temperature of 190° C. with a stretching ratio 1.31 and have 2.5 deniers, degree of contraction of 18% and mean fiber length 5 in. These fibers are gripped by a plurality of gripper and are tightened by bolts and nuts 7–8. The distance L, 12 mm. in the present example, must be determined by adjusting the free space between two adjacent gripper and in consideration of the above mentioned degree of shrinkage, 18%, the distance between two adjacent gripper is selected to be 14.6 mm., as illustrated in FIGURE 8a. The squeezing sets are then slidingly shifted in the longitudinal direction of the fibers and on and along guide rails 9, so as to loosen the free portions of fibers, as clearly illustrated at L′ in FIGURE 8b. The gripper sets, thus shifted slightly towards each other, are fixedly positioned by tightening bolts 10, which are screwed through rails 9 laterally. The fibers are then, under these conditions, immersed into a treating bath, not shown, containing a body of boiling water for about 2–3 seconds, resulting in the slackened portions of the fibers subjected to contraction and practically tensioned, as schematically represented by dash-dotted lines L in FIGURE 8b. The thus treated fibers are taken out from the bath, cooled and dried in the open air, and finally released from the grippers. The squeezed portions of the fibers, having been insulated from the influence of the heating medium, are now kept unchanged, thus providing the high shrinkage portions H, while the practically heat treating portions L′ extending between each two adjacent grippers are transformed into low or nonshrinkage portions L. In this way, the novel fibrous material having an H:L relation of 10:12 (mm.) and illustrated in FIGURE 1, has been prepared. In FIGURES 8a and 8b, the dimensions of H, L′ and L are shown as 10, 14.6 and 12 mm. respectively.

In the above case, the distance between the grippers shifted towards each other must be shorter than 12 mm. and may be adjusted to any suitable length, if the present condition is satisfied. If the above distance should be set to a value longer than 12 mm. in this example, the fibers would be heat set, which is, however, excluded from carrying out the present stage of the invention. Under some conditions, however, such heat setting may be advantageously utilized for a specific purpose, which will be described in more detail hereinafter.

The primarily treated fibrous material is then spun into yarn as in the conventional manner, and then subjected to the secondary treatment by dipping it into a boiling water bath, not shown, for about one or two minutes. Upon this treating, the portions H are subject to shrinkage and the alternate portions L are correspondingly bulked out, as already described in connection with FIGURE 6.

As the heating medium for the primary and secondary treatments, hot air may also be employed, if desired. The treating temperature for the first treatment is preferably adjusted to 140–150° C., and that for the second treatment advantageously to the same temperature range, in either case of wet or dry processing.

Instead of heat treatment, any conventional different process, such as chemical treatment may be employed for either or both of the above mentioned two stage treatments.

The substantial disclosures as set forth in the present example may be equally applicable to several further examples to be given hereinafter, except otherwise noted.

For the mass production of the above mentioned novel fibrous material, such a machine may be preferably used, wherein a number of grippers are continuously kept in motion in a successive order, and the material to be treated is gripped by the grippers at separate portions therealong and the free portions thereof are kept slackened by overfeeding provided by the movable grippers in succession.

Such a machine is described in detail, wherein single filament are treated by the machine so as to form a number of alternately arranged high and low shrinkage portions in and along the filament, adapted to be advantageously used for the production of high bulk textile products. The machine may be referred to as "the first embodiment" of machine hereinafter for convenience only.

Now, especially referring to FIGURE 19, the present machine shall be described below substantially as to its principle only.

The circulating systems are herein shown in the form of endless carrier bands such as endless chains, which are so arranged that they travel continuously along in the same direction, as long as they meet together. In the figure, both these systems are shown in part only, where they commence to meet together and to where the material fiber bundles are supplied. Each of the endless chains carries thereon a number of separate gripper elements 28, which are urged resiliently to expand in the outward direction as shown, when they are in their off-service position. In this figure, the right hand couple of gripper elements are shown, when they are about to contact together, while the left hand two couples are illustrated in their cooperating or gripping conditions, thus constituting two united grippers 66. When circulating in their free state, the elements 28 have each a radius, if measured from the center of a carrying wheel, say 14, to the working surface of the element, corresponding to a sum of working radius $r$ plus and a contractive distance $r'$. As the chain travels, each couple of gripper elements are brought into contact with each other at a crossing point P of two circles having the radius $rtr'$ about the chain wheel centers O. If more exactly considered, the said radius extending from the wheel center to the contact point of each gripper element must be expressed by $rtr''$, corresponding to the distance between the wheel center and the leading upper edge of each element, wherein, however, $r''$ is nearly equal to $r'$. For this reason, the radius under consideration shall be expressed conveniently by $rtr'$. As both chains continue to travel along, after commencement of gripping the fiber bundles by the couple of cooperating gripper elements 28, and these members arrive at a further advanced point P', which is really the crossing point of the advancing bundles with the center-to-center line O—O, the grippers are brought into exact registry with each other, after being somewhat compressed or retracted, thus they constitute together a complete gripper 66 and the fiber bundles are caught positively there between at this point. The distance between two points P and P' can be determined as a function of the contracted radius $r$ and the retractable distance $r'$.

According to a practical experiment, 1 in.-chains were employed and $r$ and $r'$ were selected to be 77 mm. and 6 mm., respectively. In this case, the distance P–P' was practically 32 mm. When the width of each gripper element is taken as 15 mm., the free distance from the preceding gripped portion of the bundles to the newly gripped portion extends 24.5 mm., or 32 mm.—15/2 mm. After the complete engagement of the two cooperating gripper elements, this distance is reduced to 10.4 mm., or 25.4 mm.—15 mm. Thus, the overfed ratio of the fiber bundles is nearly equal to 2.3 times wherein 2.3 is a ratio of 24.5/10.4.

In this way, the fed thermo-shrinkable bundles are successively gripped by a number of resiliently biased grippers while being overfed at a proper ratio, a slackened portion L' is formed between each two successive gripper units. By subjecting these bundles to heat treatments, while being kept gripped and slackened conditions and carried forward by the traveling chains, the slackened zones L' are transformed into the low shrinkage portions L, while the gripped portions are kept unchanged in their character, thereby forming the high shrinkage portions H. Thus, the fibrous material is provided therein alternately with H- and L-portions, when seen in its longitudinal direction.

More specifically, referring to FIGURES 17–18, the construction and operation of the above machine shall be described below in more detail.

Figure 17:
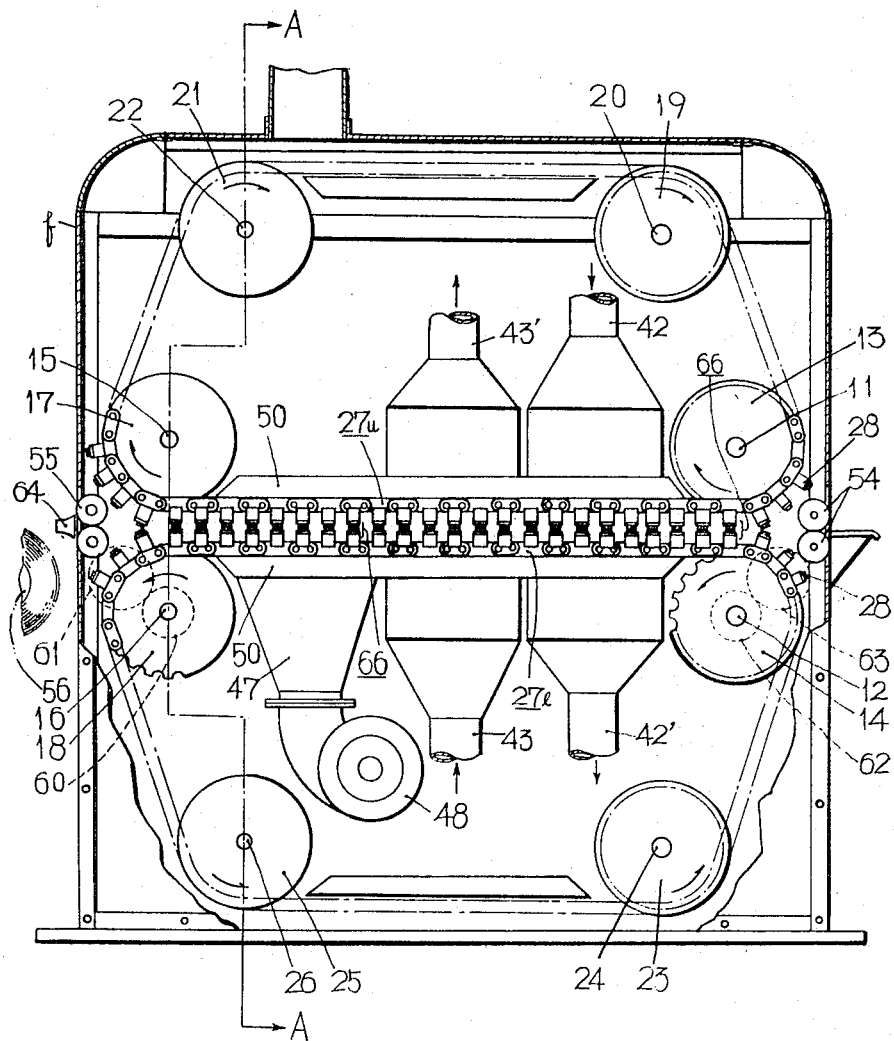
FIGURE 17 is a side view, partly broken away, of an example of a continuous production process according to the invention which is suitable to produce the fibrous material according to the invention.

In the forward part of the machine to the right hand in FIGURE 17, two parallel shafts 11–12 are vertically separated from each other and rotatably mounted in machine frame $f$. Two chain wheels 13, 13' or 14, 14' are fixedly mounted on either shaft 11 or 12, respectively. Similarly, another two shafts 15–16 are arranged and rotatably mounted in the rearward part of the machine and in a symmetrical arrangement to the forward shafts 11–12. These two rearward shafts 15–16 carry thereon two chain or sprocket wheels 17, 17' and 18, 18', respectively. Substantially above the upper shaft couple 11 and 15, other shafts 20 and 22 are rotatably mounted and mount in turn thereon two chain wheels 19, 19' and 21, 21', respectively. In the similar way, there are rotatably mounted two lower shafts 24 and 26 substantially below the shafts 12 and 16, and two chain sprockets or wheels 13, 13' and 15, 15' are fixed on the lower shafts 24 and 26, respectively.

An upper set of the wheels 13, 17, 21 and 19 supports an endless roller chain 27$u$ and another upper set of the wheels 13', 17', 21' and 19' carries a similar chain 27$u'$, for cooperation with each other, so as to establish the upper circulating system. In the similar way, the lower circulating system comprises two endless chains 27$l$ and 27$l'$, which are carried by a first set of wheels 14, 18, 25 and 23, and a second set of wheels 14', 18', 25' and 23', respectively. Each of said circulating system carries elastically thereon a number of gripper elements 28, which have been described hereinbefore in connection with FIGURE 19.

As clearly noted from FIGURES 20–23, the chain comprises a number of links 29, each of which is attached with an attachment 30 at each side thereof, as most clearly illustrated in FIGURE 21. Attachment 30 is formed with two separate pins 31 for mounting respective spring 37 contained within a casing 34, which comprises two small box elements 32 connected by two connecting bars 33, as clearly seen in FIGURE 23. At the central portion of casing 34 and between the two box elements, a groovelike opening 35 is formed. Spring casing 34 is assembled with a chain link 29 such that the attachments 30 are positioned within the casing and the link is kept in slidable engagement with groovelike opening 35. Two springs 37 are contained as above mentioned within each box element 32. The springs are supported at their one ends by the projecting pins 31, while the opposite ends of the springs are held in position by positioning pins 31' extending downwardly from the bottom surface of a holder 36, to which the connecting bars 33 are fixed, for example by fixing bolts 41 or otherwise. Thus, it will be clear, that each holder 36 extends fixedly between the two corresponding links 29 comprised in the both side upper circulating chains 27u and 27u'. As will be noted, the lower chains 27l, 27l' are constructed similarly in this respect. On the holder 36, an elongated gripper element 28 made of an elastic material such as rubber, synthetic resin, leather or the like, is fixed as by dovetail connection 38 or the like. Gripper element 28 has a width corresponding to the length of one of the H-portions to be formed in fibrous material, as well as a proper thickness for positive, yet resilient grip of the material. The length of gripper element 28 is so selected that as large as possible number of gripper elements are mounted on both of the upper and lower circulating chains at regular intervals and in the opposite, yet resiliently cooperating arrangement between the two systems. Thus, as the upper and lower endless chains continuously circulate along their closed passages, each couple of cooperative gripper elements are urged in their outward direction, brought into contact and correct registry with each other, retarded to some degree, kept in pressure registry, removed from each other, urged outwardly, and so on, thus repeating the above cyclic operation. In addition, the gripper element is positively prevented from any lateral movement relative to the carrier chains by the provision of set screws 39 as at 39 in FIGURES 20–21.

Thus, specifically in FIGURE 19, gripper elements 28 are kept in their outwardly urged position when traveling along in their off-service conditions. When, however, they arrive nearly at the termination of the leading corner, corner zone, of the corresponding circulating passage and are about to travel along the longest horizontal passage, each cooperative couple of gripper elements belonging to both circulating systems are brought into contact with each other at point P, as described hereinbefore, thus forming a gripper 66. The gripper 66 reduces then in its height under the influence of compressive force acting therein and against the action of springs 37 and arrives at point P', wherein the cooperating gripper elements are brought into perfect registry with each other and under full pressure exerted by said springs, as again set forth hereinbefore. If the fibrous material is fed into the machine at the point P, it is subjected to a positive overfeed by the engagement and contraction of the co-operating gripper elements. Thence, the gripper advances along the straight passage or zone, extending between two opposite sets of chain wheels 13, 14 and 17, 18, during which the fiber bundles are subjected to the secondary heat treatment. For this purpose, the straight zone is provided with heating medium supplying means, as will be described in more detail hereinafter.

Adjustment of the length H to meet the occasional requirement may be preferably carried into effect by exchanging the existing gripper elements for new one with a different width. There are several possibilities to alter the overfeed ratio of the fibrous material for the purpose of modification of the length L' and thus in effect the length L. As a measure for this purpose, a sheet of liner 40 made of resilient material, such as rubber, synthetic resin, leather or the like may be interposed between the attachment 30 of chain link and the bottom wall of each box element 32, in order to modify the contractive amount of each gripper. FIGURE 25 illustrates another embodiment of adjusting means utilizable for the same purpose. In the present embodiment, each attachment 30 of chain link 29 is shaped in a downwardly recessed form for reception of springs 37 and the bottom wall of the recess 57 is formed therein with a clearance opening 58, through which a bolt 59 passes and is screwed into the holder 36. The spring 37 is positioned around the bolt and abuts with its one end against the holder. By the use of longer or shorter bolts 59 and springs 37, the desired adjustment can be brought into effect.

In FIGURE 17, a pair of chain guides 50 in the form of parallel bars are provided and fixed suitably on the machine frame f. These guides serve to keep the mating gripper elements 28 in their pressure engaging relationship as the carrier chains move along the working passage which extends through the heating zone, wherein a pair of oppositely directed supply ducts 42 and 43 are provided in the relatively forward part of the machine, somewhat to the right hand side in FIGURE 17. As shown by the arrows, one of these ducts 42, directs air from above towards the operating grippers, while the other 43, directs air from below towards the grippers. Air is supplied from a blower 44, FIGURE 18, to heaters 45, whereby the air is heated to a suitably elevated temperature, thence delivered through supply ducts 42, 43 to the heating zone. Upon acting on the traveling fibrous material through the zone, the exhaust air is discharged through outlet ducts 42' and 43', respectively, and led back to the blower 44. It is also effective for the desired treatment, simultaneously to mix steam to the hot air from a nozzle 46, FIGURE 18, thereby supplying wetted hot air to the heating zone. A further duct 47 is provided in the relatively rear part of the machine to cool the heat treated material. The duct 47 is supplied with cool air from a blower 48, which is also seen in FIGURE 18.

Power is transmitted from motor 49 through reduction gearing 51 and chain 52 to wheel shaft 16, thence through chain 53 to wheel shaft 15, thereby the latter shaft is driven at the same speed as that of the former shaft.

Motion is transmitted from gear 62 on shaft 12 through idle gear 63 to a bottom roller of material delivery roller unit 55. The delivered material is wound up by a take-up drum or winder 56 through a trampet 64.

An example of continuous production of novel fibrous material on the above described machine will be set forth hereinbelow:

EXAMPLE 2.—PRODUCTION OF FIBROUS MATERIAL HAVING A RELATION 15:10.4 (MM.) OF $H:L$

As the starting material, acrilonitryl tows, same as in the preceding example, is used. The material has been heat stretched to the H-state, having a latent shrinkage potential of 18%.

As the circulating system, 1 in. pitch roller chains are used as before, being driven continuously at a rate of 10 m./min. Width of gripper element: 15 mm.; length of heating zone 2 m.; H: 15 mm.; L: 10.4 mm.; overfeed ratio: 2.5; heat treating temperature: 140–150° C. The operation is carried out with use of wetted hot air.

Fiber bundles are fed from a pair of feed rollers 54 and gripped by a number of grippers as before during passage through the transition region, where the upper and lower circulating systems advance from the leading corner zone to the respective straight zone, thereby the bundles being overfed so as to form slackened zones L', each 12.7 mm. long, and thus carried forward by the successive grippers. While thus advanced through the heating zone, the bundles are brought into contact with wetted hot air at a temperature between 140 and 150° C. for being uniformly heat treated, said heating medium being fed from supply ducts 42–43 as before. The thus treated fiber bundles are then led through the cooling zone, during which they are evenly cooled by the cooling medium supplied from duct 47, as already described. When sufficiently cooled, alternate portions L of the bundles become the desired low shrinkage portions, each 10.4 mm. long, while the intervening gripped portions H are kept unchanged as before, that is, remain in the state of desired high shrinkage portions, each having a length of 15 mm. The treated and cooled bundles are continuously delivered by delivery rollers 55 for being wound up as before. The treated comprises a number of parallel single filaments, each having a cyclic arrangement of H- and L-portions produced in an accurate and desired manner.

These fibrous material are then cut in a conventional cutter or converter, not shown, to about 5 in., and spun according to the conventional manner to form yarns, which are then passed through a separate heating chamber, not shown. In this way, the yarns are subjected to the secondary treatment at a temperature between 140 and 150° C. for about one or two minutes by means of wetted hot air. By this treatment, portions H are subject to shrinkage and portions L are bulked out, thereby high bulky yarns having superior quantities being obtained. Instead of wet drying process, purely dry heating process may be adopted with equal results.

As the starting material, tops may be employed in place of tows as above described. In this case, the fiber cutting stage is omitted and otherwise may be carried out in the same way as above and with equal results.

EXAMPLE 3.—HIGH SHRINKAGE POLYVINYLALCOHOLIC FIBERS HAVING A RELATION $H:L$ OF 10:10 (MM.)

The machine of above first embodiment is used for the treating purpose. Modification in overfeed ratio is made by replacing bolts 59 and springs 37 by those having proper sizes. For the starting material, tows of high shrinkage polyvinylalcohol fiber, 3 deniers, are employed. Upon consideration of possible shrinkage, the length L' is predetermined to be 12.2 mm. Width of gripper is 10 mm. Under these conditions, the tows are continuously fed to the heating zone in the machine in the similar way as in Example 2, wherein they are subjected to the primary heat treatment at a temperature between 130 and 140° C. for about 10–15 seconds by means of steam. By this measure, the desired novel fibrous material is obtained.

The treated material is cut as in Example 2, spun and subjected to the secondary treatment at 130–140° C. for about 1–2 minutes, using steam as the heating medium. In this way, high bulky yarns are obtained. Instead of steam, dry heated air may be employed with equal results.

EXAMPLE 4.—POLYESTER FIBERS HAVING A RELATION $H:L$ OF 10:10 (MM.)

The same machine as above is used and modification of the overfeed to the material is made by inserting leather sheets 40 in position. For the material, tows of high shrinkage polyester fibers, 5 deniers, is used. L': 12.2 mm. Width of gripper: 10 mm. The material is treated otherwise in a similar way as in Example 2, at a temperature 120–130° C. for about 10–15 seconds by means of steam, thus providing the novel fibrous material.

The material is then cut to a proper size, spun, as in Example 2, and secondarily treated, at a temperature 120–130° C. for about 3–5 minutes by means of steam. In this way, high bulky, superior quality yarns are obtained. Instead of steam, dry hot air processing may be utilized with equal results.

EXAMPLE 5.—TEXTURED YARN, WITH $H:L$ BEING 20:30 (MM.)

Filaments can be treated substantially by the same processing methods and in the same treating conditions as employed hereinbefore for tows and tops. In consideration of finer deniers of the material, however, the mass production in this case, may be carried out analogous to the conventional multi-spindle process.

In this example, the machine same as before is employed. For the material, acrylic filaments are employed, which have been hot drafted so as to have a hot water absorbing power 20%. The existing gripper elements are replaced by new one, 20 mm. wide. Bolts 59 and springs 37 are exchanged for longer one, so as to obtain a modified length of L', 37.5 mm.

The treatment is carried out otherwise same as in Example 2, and thus, the above mentioned novel fibrous material is obtained. The treated material is passed through a conventional Taslan machine and the secondary treatment is carried out.

The resulting yarn has superior properties in its bulkiness and the like to those of conventional yarn, which has been produced only through loop formation. The novel yarn has a particularly much softer "feel."

It necessary, the above texture yarn, before subjected to the secondary treatment, may be fabricated into knitted or woven products, which possess then latent shrinkage power developable upon a secondary treatment and may be utilizable for some special purposes.

EXAMPLE 6

Figure 16:
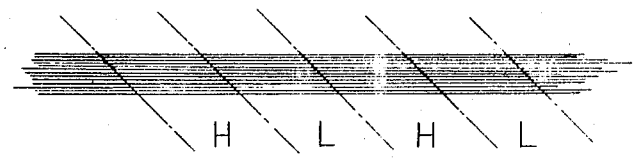
FIGURE 16 is a diagram for illustrating diagrammatically the mode of processing filament yarns.

Filaments are treated in the same manner as in Example 5, except that the filaments are provisionally untwisted and arranged parallel to each other, as illustrated in FIGURE 16. Portions H and L are provided in the group of filaments in a laterally skew manner. For this purpose, all the gripper elements are rearranged to represent such a skew arrangement between the corresponding two carrier chains.

Insteal of utilizing heat, chemical agents may be employed for the desired treatment. An example thereof will be described hereinbelow:

EXAMPLE 7

Instead of mixing steam in the treating air, vaporized trichloroethylene is used. Other treating conditions are same as in Example 2. In this way, the desired novel fibrous material is obtained.

In the present example, acetonitrile or dimethyl formamide may be used in place of trichloroethylene with equal results, as in the conventional technique.

The treated fibrous material is then subjected to the second treatment as in Example 2. In this way, similar yarns as in Example 2 are obtained.

EXAMPLE 8

The novel material as obtained by the process set forth in Example 2 is, after spinning into yarns, subjected to the secondary treatment with steam mixed beforehand with vaporized trichloroethylene according to the conventional technique. The resulting yarn is substantially same as in Example 2.

In this example, also, acetonitrile or dimethyl formamide may be used in place of trichloroethylene, according to the conventional technique and with equal results.

Next, two other embodiments of the machine for the production of the novel fibrous material will be described.

In FIGURES 26–30, a second embodiment of the machine is illustrated.

With use of the above machine, various fibrous materials of the kind as referred to hereinbefore, can be produced with high efficiency. The present machine is very simple in its design, and is easy to operate.

In FIGURES 26–28, a shaft 101 is rotatably mounted in a machine frame f in a relatively forward part (relatively right hand part when seen in FIGURE 26), which carries thereon a pair of chain wheels 102 and 102' meshing with lower chains. Inwardly separated from these chain wheels, another pair of chain wheels 103 and 103' are mounted fixedly on the same shaft 101. In advance of shaft 101, another shaft 104 is turnably mounted in the machine frame, and mounts in turn thereon a pair of chain wheels 105 and 105', the spacing thereof is equal to that between wheels 102 and 102'. In a symmetrical arrangement to shaft 101 still another shaft 106, and a separate shaft 107 below the latter shafts are mounted in the machine frame, and each carry in turn thereon one set of chain wheels 108, 108′ or 109, 109′, respectively. The upper set of chains, guide wheels 112, 112′ and 113, 113′ are provided and fixedly mounted on turnable shafts 110 and 111. In a similar way, guide wheels 116, 116′ and 117, 117′ are fixedly mounted on lowermost turnable shafts 114 and 115, respectively, which are arranged in a symmetrical arrangement to the uppermost shafts 110 and 111. An endless chain 118 engages and passes over wheels 103, 108, 113 and 112, and a parallel chain 118′ to the former passes equally over wheels 103′, 108′, 113′ and 112′. The chains 118 and 118′ constitute the upper circulating system, and the leading corner zone in the neighborhood of wheels 103, 103′ is denoted by C. The substantially oppositely arranged lower circulating system comprises two chains 119 and 119′, the former being carried by wheels 104, 102, 109, 117 and 116, and the latter by wheels 104′, 102′, 109′, 117′ and 116′ in the corresponding manner. The lower system includes rearwardly descending inclined zones 1, which extend from wheels 102, 102′ to 103, 103′. A number of gripper elements 120 are mounted on each of the upper and lower circulating carrier systems, in such a way that each two gripper elements on both systems cooperate together to form a gripper unit, when both systems substantially meet together and the corresponding elements are brought into registry with each other.

More specifically, referring to FIGURES 28–29, each chain comprises a large number of chain links 121, each of which is fixed with an attachment 122. Each gripper element 120 is bolted at its opposite ends to a couple of oppositely arranged attachments 122 on the correspondingly arranged chain links. The gripper elements 120 consist of an elastic material, such as rubber, synthetic resin, leather or the like as before, and has a width corresponding to the length of an H-portion of the fibrous material to be treated. The length of the element is preferably so selected that it may be brought into simultaneous contact with a largest possible, treatable number of the materials. The gripper element has a downwardly extending longitudinal projection, which is snugly fit in a correspondingly shaped groove 123 formed in holder 124. The gripper element is fixed thereto by means of set screws 125. These elements 120 on both systems are so arranged that they may be successively brought into intimate contact with each other, as the chains advance. To assure such contacting and cooperation, the holder 123 is bolted as at 126 through the intermediary of spacers 127 to the opposite attachments 122 of both side carrier chains.

As the carrier chains circulate, each couple of cooperative gripper elements are brought initially into effect engagement, and then into full registry with each other and thence a considerable distance kept into pressure engagement with each other, until they are caused to separate from each other at the end of the horizontal working passage of the chains. These functions naturally are repeated cyclically as the chains continue to travel around.

By such arrangement and function of all of the gripper elements, the desired overfeed is given to the fed material to be treated.

Now, referring to FIGURE 29, these functions shall be more specifically described:

At this point, consider two successive elements M and N on an upper chain shown in FIGURE 29.

In the corner range C included by the contact angle 26, wherein the chain is kept in contact with chain wheel 102, the top edge-to-top edge distance $l$ between these two successive two gripper elements is kept considerably longer than the regular gap distance $d$, as they pass around the wheel. Nearer to the terminal point P′ of the leading curved corner zone C, which is also the starting point of the straight zone S, the offset engagement is successively corrected to bring about a firm and complete registration, until at the point P′ the regular interval $d$ is attained. On the other hand, each two successive gripper elements on the lower carrier chains advance along the inclined zone $i$, as well as along the straight zone S, keeping substantially the regular interval $d$ unchanged. In the region of a leading corner C, both the upper and lower series gripper elements are so arranged, that they establish a small included angle between them and are brought into correct registry with each other at the commencement of the effective straight passage or run as above described. Thus, when heat shrinkable fibrous material is fed at such angular entrance, it is caught by a couple of gripper elements from both sides at point P in the corner C when these elements are brought into offset engagement with each other to form a gripper 128. At this point, the length of the portion of fibrous material, extending between the two successive elements M and N is substantially equal to the aforementioned spacing $l$. As the chains further advance, the gripping action becomes more and more positive and firm, and the offset engagement will approach the full registration, thus reducing continuously the offset amount, until the following or second gripper unit arrives at the end of the curved corner zone, whereat the offset will disappear. Thus, the material is slackened just a distance which accurately corresponds to the initial offset amount. In other words, the material is subject to an overfeed nearly equal to the difference $l-d$, each time the engagement of the material by the cooperating gripper elements has been completely made.

In this way, the heat shrinkable fibrous material is gripped and overfed intermittently and periodically by the engagement with upper and lower series gripper elements, thus a series of slackened portions L′ are formed in the material. When the material is subjected under these conditions to the heat treatment while advancing through a heating zone as already mentioned, the slackened portions are subjected enough to shrinkage for form low shrinkage portions L, while the periodically gripped portions H are kept unchanged, thus possessing the initial shrinkage properties and thereby providing high shrinkage portions H. By such processing, the material, such as single filaments, represents a number of alternately arranged high and low shrinkage portions H and L, when seen in the longitudinal direction of the material.

Various adjusting means may be provided to modify the overfeed ratio by, for example, increasing or decreasing the height of the gripper elements or increasing or decreasing the width of the working surface thereof. Thus, the gripper elements may be exchanged for ones of a different size or configuration. Still another measure is to modify the diameter of chain wheels 102, 102′ and 103, 103′. In this case, the number of teeth on the modified chain wheel must be correspondingly altered. For the purpose of realizing this kind of adjustability, bearings 129 mounting therein a shaft 104, which mounts in turn two chain wheels 105 and 105′, are supported adjustably in grooves 130 in the machine frame $f$, so that the shaft 104 may be suitably positioned when occasion requires in order to carry out the adjustment.

In order to increase or decrease the length of each highly shrinkable portion H, gripper elements having a corresponding width have only to the substituted for the existing ones. In this case, however, it is preferred to modify the height of the gripper elements, so as to satisfy the modified overfeed ratio. In practice, several kinds of gripper elements having different heights and widths will satisfy substantially all possible requirements.

In order to modify the length L, the length L′ may be suitably altered in accordance with the shrinkability of the material by means of the aforementioned overfeed adjusting means. Or alternatively, if occasion may demand, every other one or two gripper elements on either circulating system may be removed from the machine. If desired, roller chains having a different pitch length from the existing one may be used.

If it is desired to alter both H and L, simultaneously, any combination of the above described measures may be used.

The machine of the second embodiment, as the machine of the first embodiment, is provided with two feed ducts 131–132, which are arranged alongside the straight passage, S, one directing from above and the other in the opposite direction as shown. Exhaust ducts 131'–132' are also arranged in opposition to feed ducts 131–132, respectively, and forming a passage therebetween, thereby allowing passage of carrier chains with their grippers, as well as the material therethrough. Air is supplied from a blower 133, heated to a proper temperature by passing through heater 134, thence through said feed ducts against the gripper units 128, which periodically pass by the feed duct openings. The exhaust air is then led through exhaust ducts 131', 132', back to the blower. Along this course, if desired steam is delivered from steam injection nozzle 135 and mixed with the hot treating air to provide wet hot air streams. Cooling duct 136 is also provided, which opens at a position somewhat separated rearwards of the machine or leftwards when seen in FIGURE 26 from hot air feed duct 132. A blower 137 is provided for supplying cooling air to cooling duct 136.

Power is transmitted from motor 138 through reduction gear 139 and chain 140 to said shaft 107, which carries thereon chain wheels 109, 109', to shaft 106 at the same speed, the latter shaft mounting thereon chain wheels 108, 108', as described hereinbefore. By this arrangement, all of the chain wheels are driven simultaneously, so that the upper and lower circulating systems are synchronously driven in an endless manner. Motion is also transmitted from gear 146 on said shaft 101, through gears 147–148 to feed rollers 149. On the other hand, delivery rollers 145 are driven from gear 143 on said shaft 107, through idle gear 144. 150 represents a trumpet, 151 a winder and 152 guide rails for the circulating chains. The arrangements and purposes of these members are the same as before.

A processing example in which the above described machine of the second embodiment is used will now be described hereinbelow:

EXAMPLE 9

This concerns the production of fibrous material wherein $H:L=15:30$ (mm.).

The material to be treated is acrylic fibers as in Example 2. The fibers have a latent shrinkage potential of 18%.

Each chain is of 1 in. pitch, and each of chain wheels 102, 102', 103 and 103' has 16 teeth thereon. The width of each gripper is: 15 mm. The regular spacing between successive gripped elements is such that $d$ is 10.4 mm. and L is 30 mm. The widened top edge-to-top edge spacing between gripper elements, is 36.6 mm., which has been selected on the basis of the 18% latent shrinkage potential of the material. Distance from the center of a chain link to the working surface of the gripper element mounted thereon is 23 mm. The overfeed ratio is 36.6/10.4 which equals 3.5; the chain speed is 20–30 m./min.; the length of the heating zone is 2 m.; the heating temperature is 140–150° C. The heating medium is hot air mixed with steam.

The fiber bundles of the kind above referred to are overfed with cyclic repetition and thereby are cyclically repeated slackened portions L'. Then, these bundles are subjected to an even heat treatment, by means of wet hot air delivered from said supply ducts. The treated bundles are led into the cooling zone, wherein they are cooled by the cooling air as described before. The slackened portions L' thus shrink to form low shrinkage portions L, each of which is 30 mm. long, while the gripped portions, each 15 mm. long, are left unchanged to form high shrinkage portions H. In each single filament delivered from delivery rollers is thus formed alternately arranged H- and L-portions.

The treated fibrous material is then cut to proper length, as in Example 2, spun and then subjected to the secondary treatment. In this way, textile products having superior high bulk and other properties are obtained.

Instead of wet hot air, dry hot air may be used with equally satisfactory results.

For the starting material, top may be equivalently used in place of the tow used in the present example, with the same results. In this case, all treatments may be carried out with the same results substantially in the same manner as above, except that the cutting stage is dispensed with.

When the treated fibrous material is subjected to the secondary treatment as before, superior high bulk products can be obtained, substantially same as in Example 2.

FIGURES 31–32 illustrate a third embodiment of the machine according to the invention.

In this third embodiment of the machine, illustrated in these figures, shaft 101 carries thereon only two chain wheels 102 and 102' for the upper circulating system, wherein, however, wheels 103 and 103' have been dispensed with. Chain wheels 105 and 105' are mounted on shaft 104, which is in turn rotatably mounted below said shaft 101 and separated a proper distance therefrom. The upper and lower circulating systems are arranged in a symmetrical arrangement to each other and each describes a substantially trapezoidal passage as shown.

The overfeed mechanism in the present machine comprises pusher means. When two cooperative gripper elements on the both circulating systems are brought into registration with each other to constitute a gripper 128, as these systems rotate, a pusher plate is, from upper or lower as the case may be, driven positively into a space behind the newly established unit, thereby the advancing fiber bundles are positively urged downwardly or upwardly, so as to make the thus biased portion of the bundles between the two corresponding gripper slackened.

In FIGURE 31, at a relatively right hand side thereof, there are provided upper and lower pusher units 153, 153', each of which includes a pivotal sheath 154, the latter guides slidably a pusher plate 155, which is in turn driven by a cam 156. The sheath is made of metal, and pivoted at its remote end by a pivot 157 on machine frame f, said pivot being positioned on an imaginary vertical line drawn from point P, wherein each two cooperative gripper units on the both circulating systems are brought into initial contact with each other, as already described, thus, the sheath being adapted to pivot about said pivot 157. In addition, sheath 154 is urged forwardly of the machine, or to the right hand direction in FIGURE 31 under the influence of a spring 158. The pusher plate is made of smooth and tough synthetic resin, such as laminated Bakelite—glass fiber embedded polyester resin—or Teflon plate, from one surface of which a pin 160 projects. Pin 160 projects through a slot 159 in sheath 154 and cooperates with a further slot formed in the forward end portion of a pivotal lever 161, which is actuated by a cam 156, said lever being pivoted at an intermediate point thereof by a pin 162 on the machine frame. A stopper 166 is fixed on frame f, so as to limit the oscillatory movement of sheath 154 and pusher 155.

Since the pusher means are constructed as above, when cam 156 rotates to oscillate angularly the lever 161, thereby the pin 160 cooperating with the free end of the lever, and thus pusher plate 155 being caused to reciprocate in the vertical direction. For instance, at a moment, the pusher plate is elevated into the region just behind the newly united gripper unit so as to push the corresponding zone of the fiber bundles upwards. Then, the pusher is urged by an advancing gripper element 120 or its holder 123 from behind and caused to rotate a slight angle about its pivot 157 and in the downward direction, during which the following two cooperative gripper elements are brought into engagement with each other, thus bringing about a complete gripper unit. In this way, the portion of the fibrous material extending the first and the second mentioned gripper unit 128 is slackened by such degree that it has been biased vertically by the pusher, which means that the material portion has been overfed as required.

The ratio of the above mentioned overfeed may be modified, for instance, by the following adjusting means: As an example, the pivot point 162 of the pivotally movable lever 161 may be adjustably shifted, so as to modify the amplitude of the lever. Or, alternatively, the normal resting point of pin 160 on pusher plate 155 may be shifted vertically, so as to alter the normal starting position of the working extreme edge of pusher plate 155.

The opposite or upper pusher unit 153 is mounted above the point P in an inverted position relative to the lower unit 153. Other detail arrangements of upper unit 153' are just same as those of the lower unit. Camshaft 167 for the upper unit 153' is coupled as at 168 to shaft 169, which is driven through chain means 172 from camshaft 165 to be described hereinbelow.

Power is transmitted from a motor, not shown, through a reduction gear, not shown, to pulley 175, thereby main shaft 163 is brought into rotation. With rotation of main shaft 163, a worm 173 fixed thereon is also caused to rotate, thereby gear 143 on said shaft 107 being also brought into motion and thus chain wheel 109 being also actuated. On the other hand, motion is transmitted from main shaft 163 through reduction gear 164 to said camshaft 165, thereby the cam 156 for the lower pusher unit 153 being also driven. At the same time, motion is transmitted from chain means 172 to the camshaft 167 for the upper pusher unit 153', thereby its cam 156 being also driven.

The main construction and operation of the present third embodiment of machine are same as those of the second machine. If desired, either pusher plate 153 or 153' only may be actuated, with the remaining one being kept at rest. The cams for the both pusher units may be arranged with 180° off-phase to each other, so that they may actuate alternately from upper and bottom.

An example, wherein the novel fibrous material is produced with use of the above mentioned third embodiment machine, together with detail description of the operation of the latter, shall be given hereinbelow:

EXAMPLE 10

$H:L = 10:20$ (mm.)

The starting material in this example is same as in Example 9.

At first, the lower pusher unit 153 only is used. Pitch of chain: 1 in. Width of gripper element: 10 mm.; spacing between two successive gripper elements: $d=15.4$ mm. From these data, and in consideration shrinkage ratio 18%, the length L' of fibrous material, which is to be subjected to overfeeding is determined to be 24.4 mm. From this, the biasing stroke of pusher is determined to be 9.4 mm. The adjustment of the biasing stroke has been carried out by modifying the oscillation amplitude of lever 161. Adjustment of position of pin 160 on pusher plate 155 has been made in the similar way. The treatment has been carried into effect at a heating temperature between 140 and 150° C. for about 2–3 seconds and by means of wet hot air.

The fed fiber bundles through feed rollers are successively urged vertically for the desired overfeeding so as to make L' 24.4 mm. and then, while advanced, held gripped by a series of gripper as already described, thus being carried thereby into a heating zone, wherein the bundles are brought into contact with wet hot air. Thereupon, the treated bundles are carried into a cooling zone in the usual way, wherein they are cooled by cooling air, and thus the slackened portions L' of the bundles are subject to shrinkage, each to a length of 20 mm., to provide the low shrinkage portions L, while the gripped portions are kept unchanged to provide the high shrinkage portions H, each having a length of 10 mm., as in the previously described manner. Thus, the treated material in this way, and delivered from the delivery rollers, is formed therein with cyclically repeated portions H and L in an alternate manner.

The treated fibrous material is then cut to a desired size as in the case in Example 9, and then heat treated again at a temperature of 140–150° C. for about 1–2 minutes by means of wet hot air. In this way, superior high bulk yarns are obtained.

Further, according to the invention, various further modified fibrous material can be provided. Several examples thereof shall be described hereinbelow:

EXAMPLE 11.—FIBROUS MATERIAL PROVIDING MORE THAN TWO DIFFERENT RATIOS OF LENGTH H AND OF $H:L$ IN A SINGLE FILAMENT

In the present example, $H_1$–$H_3$ are selected to be 15 mm., 15 mm. and 25 mm., resectively, while $L_1$–$L_3$ are 16 mm., 41 mm. and 41 mm., respectively. The material to be treated upon is same as used in Example 9. In consideration with the shrinkage 18%, $L_1$, $L_2$ and $L_3$ are to be 19.5, 50 and 50 mm., respectively.

In this case, the second embodiment of machine is used, wherein the following dimensional adjustments have been made: Number of teeth on each of chain wheel 102, 102', and 103': 25; pitch of chain: 1 in.

A first, two 15 mm.-wide gripper elements are attached on to each of the upper and lower circulating systems, and next the same procedure as above is once repeated. Third, the next succeeding seating positions for grippers are left empty for the both systems. Fourth, two 25 mm.-elements are attached to the further succeeding seating position on the both systems. Fifth, the next seating positions are kept emptied. Sixth, two 15 mm.-elements are positioned on to the further succeeding seats on the both systems, and so on. The above attaching procedures are repeated, until all of the gripper seats on the both systems have been completed.

To the above arranged machine, the fiber bundles are fed from the feed rollers, which bundles are then subjected to alternately repeated gripping and overfeeding.

In this way, while keeping the lengths of $H_1$, $L_1$, $H_2$, $L_2'$, $H_3$ and $L_3'$ maintained at 15, 19.5, 15, 50, 25 and 50 mm., respectively, the bundles are carried into the heating zone as usual. Further treatment is carried out same as in Example 9. Thus, the fibrous material in the form of fiber bundles, which provides therein in the longitudinal direction of fibers cyclically repeated six zones $H_1$, $L_1$, $H_2$, $L_2$, $H_3$ and $L_3$ as above stated, and especially suitable for use in the manufacture of high bulk textile products.

EXAMPLE 12

$H_1:L_1:H_2:L_2 = 10:20:15:30$ (mm.)

The treating machine is the third embodiment of machine and the above mentioned relative ratio is employed; other treating conditions are same as in Example 10.

In this case, in consideration of shrinkage 18%, the length $L_1'$ in selected to be 24.4 mm. and $L_2'$ to be 36.6 mm.

For the gripper arrangement, 10 mm.- and 15 mm.-wide elements have been employed and attached alternately to the carrier chains. The lower pusher unit 153 is effective to act upon each to-be-$L_1$-portion from upper. In the alternate manner, the upper pusher unit 153' has been arranged to operate upon each to-be-$L_2$ portion from bottom. In this case, the space gap of two successive gripper elements is 12.9 mm., the biasing distance of the lower pusher unit 153 is adjusted to about 10.3 mm. and that of the upper pusher 153' to about 18.3 mm.

The cams for the both units 153 and 153' are adjusted in its rotational speed and arranged off-phase 180° to each other, so as to operate the corresponding pusher plates in the aforementioned manner.

With use of any of the above three embodiments, various types of the novel fibrous material can be produced. Several examples thereof shall be set forth in detail hereinbelow:

EXAMPLE 13.—FIBROUS MATERIAL HAVING DIFFERENT DENIERS IN A SINGLE FILAMENT AND A RATIO 15/20 (MM.) FOR $H/L$

For the material are used tows of acrylic fibers, heat stretched beforehand and having a degree of possible shrinkage, 18%. At first, the first embodiment machine is used, wherein each of the existing gripper elements has been replaced by that having a width of 15 mm. For the purpose of gripping the fibers without any overfeed, the usual spring means have been removed from each gripper element. Thus, in operation with the machine, the gripper elements are brought into contact and registration only during the cooperating straight zone of the both circulating systems. The spacing between the top edges of two successive gripper elements is selected to be 20 mm. corresponding to the desired L-length in this case.

Then, the tows are fed from the feed rollers into the machine and gripped successively by a number of series advancing gripper with the intervening gaps of the fibrous material being not slackened. Thus, H is 15 mm. long and L' is 20 mm., and so on, in a cyclically repeated order. The material is advanced, while kept in this condition, into the heating zone, wherein the material is brought into contact with wet hot air, supplied at a temperature 140–150° C. from the supply ducts, thus being subjected to the primary treatment.

L'-portions of the treated material have been thus subjected to the above heat treatment to provide L-portions, under tension and thus without shrinkage, so that no variation in their length and count. The single filaments thus delivered from the delivery rollers are provided therein the above mentioned L- and H-portions alternately.

The treated material is cut to 5 in. lengths, and then subjected to the secondary treatment at a temperature 140–150° C. for 1–2 minutes by means of wet hot air. By this treatment, the H-portions are subjected to shrinkage, thus representing a relatively small count in comparison with L-portions heat set to the original strength, while these finer L-portions are bulked out.

EXAMPLE 14

Treating conditions herein are same as in Example 13, except the second embodiment machine is used instead of the first embodiment. Overfeed is also dispensed, so that the material is intermittently and cyclically gripped, while advancing along the common straight zone of said both circulating systems as before.

In the presently employed machine, since the bearing 129 mounting the shaft 106 is slidable in and along the slot 130 in the machine frame f, the bearing is shifted downwardly, until the inclined zone of the lower circulating system is brought into its horizontal position, thereby the usual overfeed disappear with the carried material being conveyed without any slackened part.

EXAMPLE 15

Treatment is carried out under same conditions as above, except that the third embodiment machine is used instead of the second embodiment in Example 13. In this case, some adjustments have been made beforehand as follows:

The shaft coupling 168 has been disengaged so as to make the upper pusher unit 153' ineffective. Then, the reduction gear 164 has been disengaged, so as to make the lower pusher unit 153 ineffective. Thus, in operation, the material is advanced while periodically gripped, without forming any slackened portion, and also without overfeeding. For the fed material, intermediate products delivered from the cutter section and to be supplied to the crimper section of a turbostapler, have been used. In this case, since the material consisting of the H-state fibers are fed to the presently used machine in a regular order with no crimps so that the tensioning may be substantially easily carried out. It is preferable and advantageous to install, if wanted, a crimper means at the delivery side of the machine, so as to further improve the spinnability of the delivered products.

It will be clear from the foregoing that similar effects as in the case of the preceding three examples may be obtained with use of the most simplified machine as was described in connection with Example 1, if the operation for bringing two successive gripper units nearer to each other has been omitted.

For the processing material, fibers which have not yet been subjected to heat stretching may be used and they are partially heat stretched at intervals, so as to produce the novel fibrous material according to the invention. An example of such treatment shall be given hereinbelow:

EXAMPLE 16

$H:L=13.5:15$ (mm.)

In this case, the third embodiment machine is used. The spacing between two successive gripper units is selected to be 10.4 mm.

For the material to be treated upon, tows of acrylic fibers are used, the degree of stretching thereof being decided to be 1.3.

These tows in the state L are fed by the feed rollers into the presently used machine and gripped successively by a series of gripper units while never slackened between each two successive grippers, and advanced. Two successive grippers grip firmly the tows, so that the material portion therebetween may be kept tightened. One of the pusher units has been shifted a slight distance to the left as compared to its normal position.

At the central position between the two adjacent gripper, the pusher plate 155 is actuated at a proper time, as already mentioned, upwardly against the advancing material to bias it in the same direction, while it is subjected to the second heat treatment in the presence of dry hot air supplied from ducts 131 at a temperature between 200 and 220° C. These ducts have been arranged in an inclined position so as to direct to the above mentioned biased region of the moving material, yet without interfering in any way with the operation of the pusher unit, resulting in the positively biased portion subjected to a heat stretching to provide thereby an H-portion, while the gripped portions by the related gripper units are kept unchanged so as to provide each a L-portion and so on. In the present processing, therefore, and on the contrary to the foregoing several examples, each of the gripper elements has been designed to have a width of 15 mm., which corresponds to the length of an L-portion. Considering that the length H is 13.5 mm. and the spacing between two successive grippers is 10.4 mm., and the preselected stretchability is 1.3, the biasing stroke of the pusher plate is selected to be 4.3 mm.

The thus treated material is cooled as before and then delivered through the delivery rollers. This treated material provided therein an alternately repeated arrangement of the predetermined H- and L-portions. Instead of fiber bundles, filament yarns may be also employed with equal results. Tops may be equally employed with superior results.

The resultant novel fibrous material has similar characters and effects as in the case of the more general process in the invention. In regard of a secondary treatment to the novel material and yarns, knitted, woven or non-woven fabrics produced of said material, are the explanations omitted which are similar to the preceding and following several examples.

EXAMPLE 17

$H:L = 10:17$ (mm.)

The fibrous material having the opposite ends treated into the state only H-portion.

A cutter, not shown, has been fitted to the first embodiment machine at a position in direct advance thereof.

Single filaments are treated in the machine just same as in Example 2 and provided therein alternately and cyclically arranged H- and L-portions as usual. The thus treated fiber bundles are then delivered out from the delivery rollers so as to be cut by the cutter, the operation of which was beforehand adjusted in connection with the feed so as to provide such cut products as having their opposite ends providing only H-portions. In this way, the desired fibers only can be produced.

Converter may be used in place of the above mentioned cutter and with equal results.

Also, the second or third embodiment machine can be used in place of the first embodiment and with equal results.

EXAMPLE 18

$H:L = 10:12$ (mm.)

The fibrous material having the opposite ends treated into the state of only L-portions.

In the present example, the operation is carried out same as in the preceding Example 17, except that the cutting cycle has been adjusted so as to provide the desired products having their opposite ends made of only L-portions.

In connection also with Example 17, the cutting operation is so carried out that it cuts the treated products at predetermined points, more specifically those lying in the boundary between H- and L-portions so as to produce, simultaneously, for instance, both types of fibers, such as H-L-H-L type and L-H-L-H-L type. In this case, it is also recommendable to provide means for separation of these two types of fibers from each other.

EXAMPLE 19.—WOVEN TEXTILE FABRICS

The fibrous material prepared in Example 2 are cut to a proper size, prepared properly as in the conventional manner, spun, woven and then subjected to the secondary treatment at a temperature 140–150° C. for 2–3 minutes, resulting in the H-portions thereof subjected to contraction and the L-portions bulked out as usual. In this way, high bulk textile products having superior quality as already stated herein can be obtained.

By this means, various textile products, such as milled-woolen fabrics (for instance, flannel, tweed and the like) and other high bulk products can be obtained with superior results.

EXAMPLE 20.—KNITTED TEXTILE FABRICS

The knitting is replaced for the weaving in Example 19, others being carried out as same therein. The thus prepared knitted products possess superior high bulkiness and other characteristics.

Flat-, warp-, and circular knitted various products, such as bulky sweaters, underwears, stockings, overcoats and the like, characterized in their high bulkiness, can be effectively produced as above mentioned.

EXAMPLE 21.—NON-WOVEN FABRICS

The fibrous material, which has been produced substantially in the same way as in Example 2 and an $H:L$ relation of 10:20 (mm.), is cut to 2 in. size. These cut fibrous materials are used for webs and subjected to the conventional carding; then bound together as in the conventional way by means of acrylic emulsion binder; dried at a relatively low temperature; and finally subjected to the secondary treatment under no tension and in the pressure of steam. By the last mentioned treatment, the H-portions are subjected to shrinkage, while the L-portions are bulked out, thus providing high bulk non-woven fabrics, which are further finally heat treated as in the conventional way to provide the desired high bulky final products.

The resultant high bulk non-woven fabrics are characterized in their high uniformity in bulkiness.

While there have been shown and described several particular embodiments of this invention, it will be obvious to those skilled in the art that various changes and modifications may be made therein without departing from the invention. Especially, bulking conditions may be varied within a vast range to meet the desired objects, usage, and properties as well as so as to obtain advantages and, conveniences enjoyable in the processing stages, and therefore, any desired degree of relaxation may be employed for this purpose. It is, therefore, intended in the appended claims to cover all such changes and modifications as fall within the true spirit and scope of the invention.

What we claim and desire to secure by Letters Patent is:

1. A machine for treating fibrous material, said machine comprising, in combination, means for feeding said fibrous material through a treating zone, means for bringing a relaxing medium into contact with said fibrous material in said treating zone and means to isolate spaced longitudinal portions of said fibrous material from said contact with said relaxing medium, said means for isolating comprising gripping means for gripping said spaced longitudinal portions of said fibrous material and thereby to isolate said portions from said contact with said relaxing medium and said means for feeding said fibrous material including means for over-feeding said fibrous material as it is gripped so that the longitudinal portions of said fibrous material between the gripped portions are initially slack and therefore free to shrink.

2. The machine defined in claim 1, wherein said means for feeding said fibrous material comprises juxtaposed endless belts, said means to grip spaced longitudinal portions of said fibrous material comprises gripper elements mounted on said endless belts, the gripper elements of at least one of said belts faces and is in contacting relation with the gripper elements of at least another of said belts along a plane of closest juxtaposition of said belts, said means for feeding said fibrous material further comprises drive means to move said endless belts in opposite directions, said plane of closest juxtaposition of said belts includes a path of movement for said fibrous material and said path is principally defined by said contacting of said gripper elements, said fibrous material being guided between said gripper elements as said gripper elements move toward said plane of closest juxtaposition with the movement of said belts, whereby said fibrous material is gripped between those gripper elements in contacting relation with one another and is fed and advanced by the motion of said contacting gripper elements as said endless belts are driven by said drive means.

3. The machine defined in claim 2, wherein said means to overfeed said fibrous material comprises means to provide a distance between the first point on said plane of closest juxtaposition at which said gripper elements come into contact and the next contacting gripper elements, which distance is longer than the distance between said next contacting gripper elements and the very next one thereafter.

4. The machine defined in claim 3, wherein said means to overfeed said fibrous material comprises means to guide at least one of said belts, as it approaches said plane of closest juxtaposition, in a path which defines an acute angle with said plane.

5. The machine defined in claim 3, wherein said means to overfeed said fibrous material comprises a pusher means which is mounted adjacent the path of said fibrous material before said path reaches said plane of closest juxtaposition, said pusher means comprising a member which is mounted to reciprocate transversely across said path at a point before said plane of closest juxtaposition, said member being operable in coordination with said belts, said member being movable into said path when said path is not between gripper elements approaching contact and out of said path when said path is between gripper elements approaching contact, whereby said member pushes against said fibrous material each time said member moves into said path and thereby causes said fibrous material to travel over said member and lengthen its path of travel, creating an overfeed which manifests itself as a slack in the fibers between successive contacting gripper elements.

6. The machine defined in claim 3, wherein said means to bring a relaxing medium into contact with said fibrous material comprises duct means for transporting said relaxing medium, said duct means having an outlet adjacent to said plane of closest juxtaposition.

7. The machine defined in claim 6, further comprising means to bring an after-treating medium into contact with said fibrous material after said fibrous material has passed along said plane of closest juxtaposition.

8. The machine defined in claim 7, wherein said means to bring an after-treating medium into contact with said fibrous material comprises duct means for transporting said after-treating medium, said duct means having an outlet adjacent to the path of said fibrous material after said fibrous material has passed along said plane of closest juxtaposition.

References Cited by the Examiner

UNITED STATES PATENTS

| | | | |
|---|---|---|---|
| 563,165 | 6/1896 | Grant | 68—211 |
| 2,044,458 | 6/1936 | Adams | 68—211 |
| 2,055,957 | 9/1936 | Wilcox | 68—211 |
| 2,319,903 | 5/1943 | Huey et al. | 8—114.5 |
| 2,373,194 | 4/1945 | Luttge | 8—114.5 X |
| 2,952,033 | 9/1960 | Goodwin | 8—148 X |
| 2,962,025 | 11/1960 | Bertrand | 8—114.5 |
| 3,129,485 | 4/1964 | Shattuck | 28—72 |

MERVIN STEIN, *Primary Examiner.*

L. K. RIMRODT, *Assistant Examiner.*